US011855719B2

United States Patent
Wang et al.

(10) Patent No.: US 11,855,719 B2
(45) Date of Patent: Dec. 26, 2023

(54) QUANTIZED PRECODING IN MASSIVE MIMO SYSTEM

(71) Applicant: Nokia Solutions and Networks Oy, Espoo (FI)

(72) Inventors: Lijun Wang, Zhejiang (CN); Weiqiang Mao, Zhejiang (CN)

(73) Assignee: Nokia Solutions and Networks Oy, Espoo (FI)

( * ) Notice: Subject to any disclaimer, the term of this patent is extended or adjusted under 35 U.S.C. 154(b) by 93 days.

(21) Appl. No.: 17/772,569

(22) PCT Filed: Oct. 30, 2019

(86) PCT No.: PCT/CN2019/114495
§ 371 (c)(1),
(2) Date: Apr. 28, 2022

(87) PCT Pub. No.: WO2021/081848
PCT Pub. Date: May 6, 2021

(65) Prior Publication Data
US 2022/0393731 A1    Dec. 8, 2022

(51) Int. Cl.
*H04B 7/0456* (2017.01)
(52) U.S. Cl.
CPC ................. *H04B 7/0456* (2013.01)
(58) Field of Classification Search
CPC .............. H04B 7/0456; Y02D 30/70
See application file for complete search history.

(56) References Cited

U.S. PATENT DOCUMENTS

| 2012/0099666 | A1* | 4/2012 | Baldemair | H04L 27/2617 375/260 |
| 2013/0010841 | A1* | 1/2013 | Seo | H04B 7/15521 375/214 |
| 2015/0280801 | A1* | 10/2015 | Xin | H04L 5/0048 370/329 |

FOREIGN PATENT DOCUMENTS

| CN | 107566021 A | 1/2018 |
| CN | 108712196 A | 10/2018 |

(Continued)

OTHER PUBLICATIONS

Chen, Jung-Chieh, "Joint Antenna Selection and User Scheduling for Massive Multiuser MIMO Systems with Low-Resolution ADCs", © 2018 IEEE, 6 pgs.

(Continued)

*Primary Examiner* — Sung S Ahn
(74) *Attorney, Agent, or Firm* — Harrington & Smith

(57) ABSTRACT

Example embodiments of the present disclosure relate to a transmitter, method, apparatus and computer readable storage medium for quantized precoding in a massive multiple-input multiple-output (MIMO) system. In example embodiments, a transmitter determines a normalized factor for precoding of a plurality of signals intended for a plurality of receivers. The first device precodes the plurality of intended signals using the normalized factor by iteratively performing acts. The acts include determining, by using the normalized factor, a descending direction of a difference between the plurality of intended signals and corresponding signals received at the plurality of receivers, a descending rate of the difference being above a threshold rate in the descending direction, and determining a plurality of precoded signals based on the descending direction. Then, the first device quantizes the plurality of precoded signals for transmission by the transmitter to the plurality of receivers.

20 Claims, 27 Drawing Sheets

(56) References Cited

FOREIGN PATENT DOCUMENTS

EP          3 306 828 A1    4/2018
WO    WO 2016/120443 A1    8/2016

OTHER PUBLICATIONS

Li Yi et al., "Normalization Preceding Algorithm of Massive MU-MIMO System", *Video Engineering*, vol. 39, No. 19, Dec. 31, 2015 (Dec. 31, 2015).
Chen, Jung-Chieh, "Efficient Constant Envelope Precoding Quantized Phases for Massive MU-MIMO Downlink Systems", IEEE Transactions on Vehicular Technology, IEEE vol. 68, No. 4, Apr. 2019, 5 pages.
Khojastepour, Mohammad Ali, et al., "Quantized Linear Mimo Precoding for Multiuser Downlink Systems", IEEE $42^{nd}$ 4 Annual Conference on Information Sciences and Systems, Mar. 2008, pp. 978-983.

* cited by examiner

QUANTIZED PRECODING IN MASSIVE MIMO SYSTEM

CROSS REFERENCE TO RELATED APPLICATION

This patent application is a U.S. National Stage application of International Patent Application Number PCT/CN2019/114495 filed Oct. 30, 2019, which is hereby incorporated by reference in its entirety.

FIELD

Example embodiments of the present disclosure generally relate to the field of communications, and in particular, to a transmitter, method, apparatus and computer readable storage medium for quantized precoding in a massive multiple-input multiple-output (MIMO) system.

BACKGROUND

The massive multiple-input multiple-output (MIMO) technology is widely considered to be a core technology in fifth-generation (5G) wireless communication systems. This technology can significantly improve the spectral efficiency and reliability by providing a base station (BS) with hundreds of antennas to serve tens of user equipment (UEs) in the same time-frequency resource. However, a substantial number of antennas and radio frequency (RF) chains at the BS would result in excessively high hardware costs and power consumption, which obstruct the commercial deployment of massive MIMO systems. In this situation, the practical implementation of the massive MIMO technology requires the use of low-cost and power-efficient hardware components at the BS.

In a massive MIMO system, high-resolution digital-to-analog converters (DACs) and/or analog-to-digital converters (ADCs) may bring a major part of power consumption and hardware cost. However, the power consumption of the DACs and/or ADCs may increase exponentially with a resolution (in bits) and linearly with a bandwidth. Low-resolution DACs and/or ADCs can significantly reduce the power consumption, system costs, and raw baseband data rates. Moreover, the resolution of the DACs may also affect the amount of data that needs to be exchanged between a baseband-processing unit and a radio unit. A lower DAC resolution can reduce the amount of data for exchanging and therefore may mitigate a data-rate bottleneck in fronthaul. As a result, the use of the low-resolution DACs and/or ADCs in an antenna and a RF chain may become an effective implementation of the massive MIMO system.

Quantized precoding is a key technique for the low-resolution DACs. Quantized precoding can bring many benefits for the massive MIMO system. However, conventional quantized precoding algorithms can hardly achieve better performance of signal detection at a UE, or have higher computational complexity, especially for high-order modulations.

SUMMARY

In general, example embodiments of the present disclosure provide a transmitter, method, apparatus and computer readable storage medium for quantized precoding in a massive MIMO system.

In a first aspect, a transmitter is provided which comprises at least one processor and at least one memory including computer program code. The at least one memory and the computer program code are configured to, with the at least one processor, cause the transmitter to determine a normalized factor for precoding of a plurality of signals intended for a plurality of receivers. The first device is caused to precode the plurality of intended signals using the normalized factor by iteratively performing acts. The acts comprise determining, by using the normalized factor, a descending direction of a difference between the plurality of intended signals and corresponding signals received at the plurality of receivers, a descending rate of the difference being above a threshold rate in the descending direction, and determining a plurality of precoded signals based on the descending direction. The first device is further caused to quantize the plurality of precoded signals for transmission by the transmitter to the plurality of receivers.

In a second aspect, a method is provided. In the method, a transmitter determines a normalized factor for precoding of a plurality of signals intended for a plurality of receivers. The first device precodes the plurality of intended signals using the normalized factor by iteratively performing acts. The acts comprise determining, by using the normalized factor, a descending direction of a difference between the plurality of intended signals and corresponding signals received at the plurality of receivers, a descending rate of the difference being above a threshold rate in the descending direction, and determining a plurality of precoded signals based on the descending direction. Then, the first device quantizes the plurality of precoded signals for transmission by the transmitter to the plurality of receivers.

In a third aspect, there is provided an apparatus comprising means for performing the method according to the second aspect.

In a fourth aspect, there is provided a computer readable storage medium comprising program instructions stored thereon. The instructions, when executed by a processor of a device, cause the device to perform the method according to the second aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
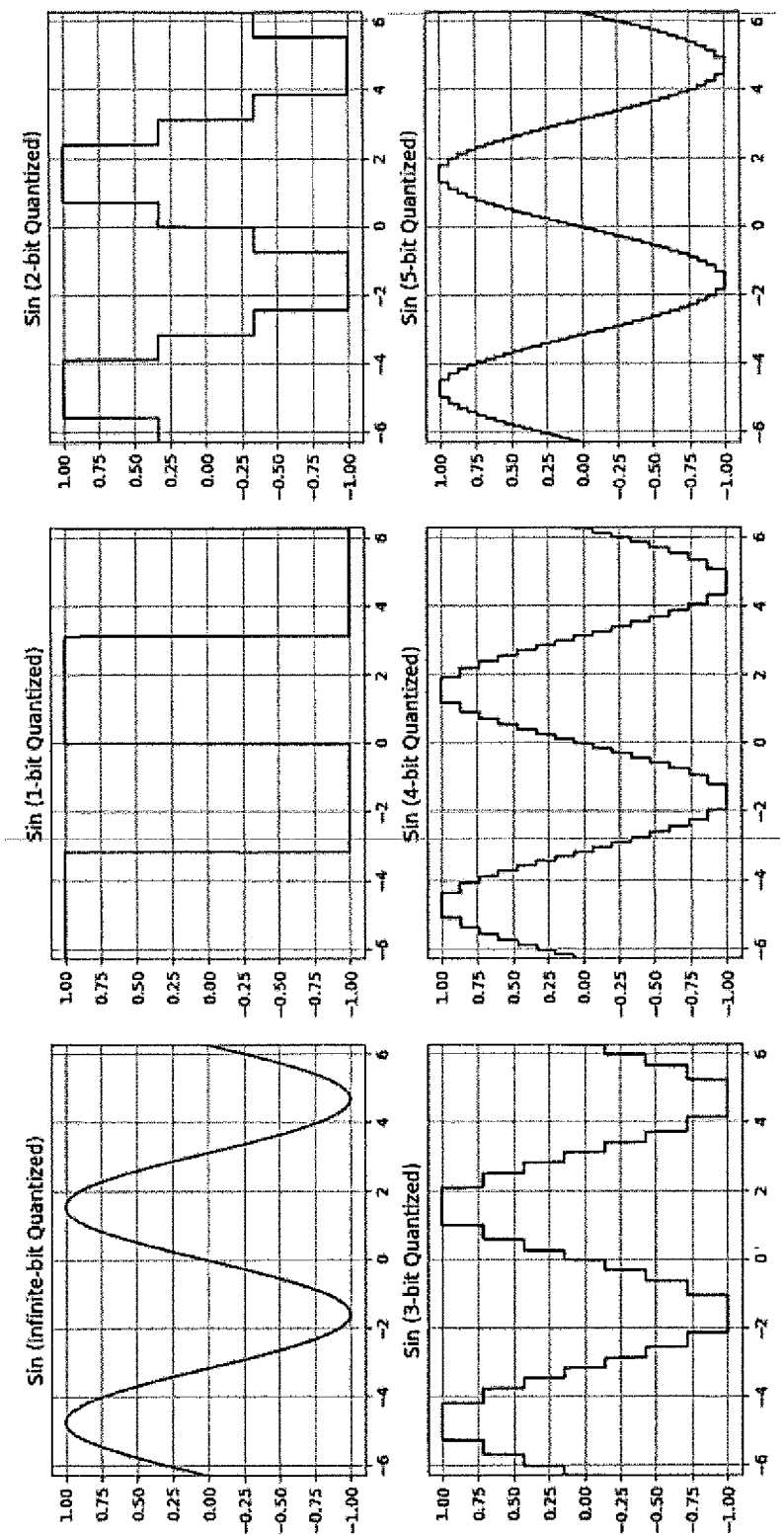
FIG. 1 illustrates example distortions of quantization with different bits.

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "transmitter" refers to a device capable of transmitting a signal. As used herein, the term "receiver" refers to a device capable of receiving a signal. The transmitter or receiver may be implemented by or as a part of any suitable device, including, for example, a network device or a terminal device. In some example embodiments, the transmitter and/or receiver may be provided with a plurality of antennas. These antennas may comprise physical or logical antennas.

As used herein, the term "terminal device" or "user equipment" (UE) refers to any terminal device capable of wireless communications with each other or with the base station. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to the base station on predetermined schedules, when triggered by an internal or external event, or in response to requests from the network side.

Examples of the UE include, but are not limited to, smart phones, wireless-enabled tablet computers, laptop-embedded equipment (LEE), laptop-mounted equipment (LME), wireless customer-premises equipment (CPE), sensors, metering devices, personal wearables such as watches, and/or vehicles that are capable of communication. For the purpose of discussion, some example embodiments will be described with reference to UEs as examples of the terminal devices, and the terms "terminal device" and "user equipment" (UE) may be used interchangeably in the context of the present disclosure. The UE may also correspond to Mobile Termination (MT) part of the integrated access and backhaul (IAB) node (a.k.a. a relay node).

As used herein, the term "network device" refers to a device via which services can be provided to a terminal device in a communication network. As an example, the network device may comprise a base station. As used herein, the term "base station" (BS) refers to a network device via which services can be provided to a terminal device in a communication network. The base station may comprise any suitable device via which a terminal device or UE can access the communication network. Examples of the base stations include a relay, an access point (AP), a transmission point (TRP), a node B (NodeB or NB), an evolved NodeB (eNodeB or eNB), a New Radio (NR) NodeB (gNB), a Remote Radio Module (RRU), a radio header (RH), a remote radio head (RRH), a low power node such as a femto, a pico, and the like. A relay node may correspond to Distributed Unit (DU) part of the IAB node.

As used herein, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular base station, or other computing or base station.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

The massive MIMO technology utilizes a considerable number of antennas at the BS to serve many UEs that each have a small number of antennas. This technology could bring significant improvement in terms of spectral efficiency, energy efficiency, reliability and coverage. However, it would suffer from high hardware complexity, system costs and circuit power consumption.

The use of low-cost and power-efficient hardware components at the BS is quite important for practical massive MIMO systems. The low-resolution ADCs/DACs can significantly simplify a transmitter, a receiver or a transceiver and reduce the hardware complexity, system costs and power consumption. However, low-resolution DACs and/or ADCs would lead to significant distortions on signals as shown in FIG. 1, which will bring a great challenge to a precoding design.

Conventional precoding schemes are designed upon an assumption that the resolution of DACs is nearly infinite. However, this assumption cannot be ensured in practical systems. In practice, 10 bits or more may allow conventional precoders to achieve a satisfying performance. When using the low-resolution DACs, for example, with 1-3 bits, quantization would bring significant distortions on precoded signals, which would degrade the performance of conventional precoders a lot. Recently, quantized precoding has drawn more and more attention to ensure the performance when using low-resolution DACs in the massive MIMO system.

Figure 2:
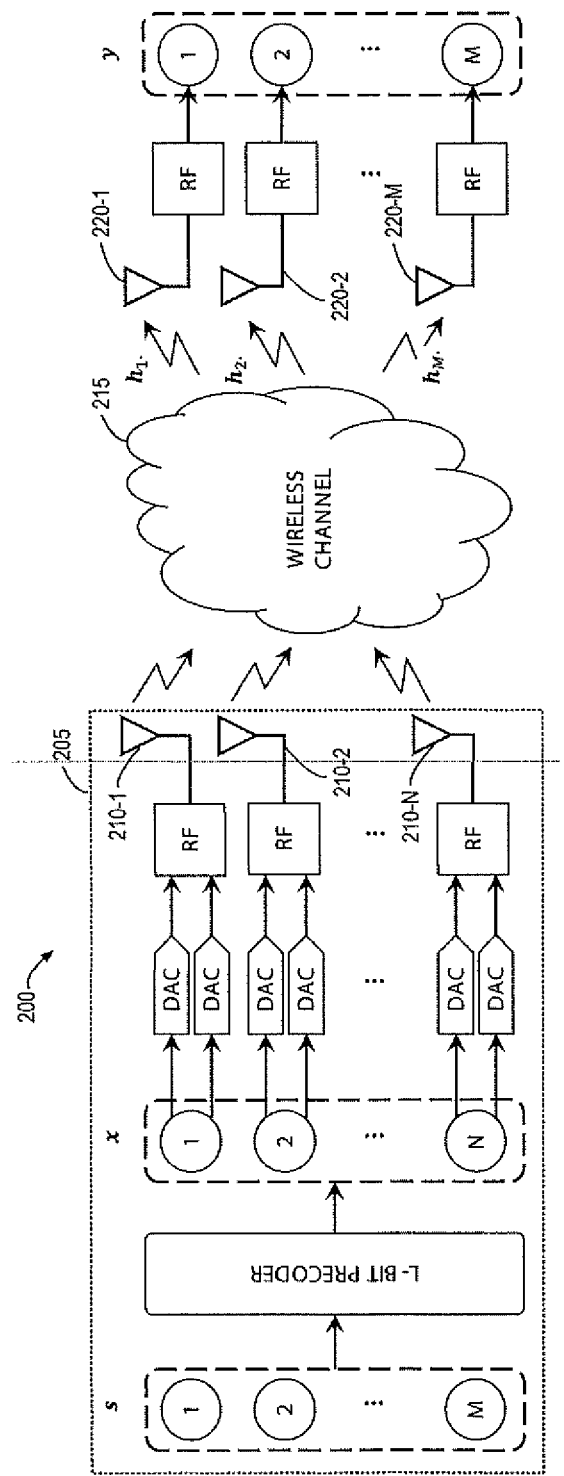
FIG. 2 illustrates an example system model of quantized precoding in a massive MIMO system.

FIG. 2 shows an example system model 200 of quantized precoding in a massive MIMO system. As shown, a BS 205 equipped with N transmitting antennas 210-1, 210-2, . . . , 210-N is serving M active streams simultaneously over a wireless channel 215 in the same frequency band. In this example, the M active streams are directed to M UEs, each provided with a receiving antenna 220-1, 220-2, . . . , or 220-M. N and M represent any suitable positive integers.

The signals intended for the UEs are represented as a vector s (with a size of M×1), and the precoded signals are represented as a vector x (with a size of N×1). Then, the received signals y can be calculated as:

$$y = Hx + n \quad (1)$$

where H (with a size of M×N) represents a channel matrix of the wireless channel 215, and a noise vector n (with a size of M×1) represents noises. It is assumed that entries of H (where an entry in the ith row and the jth column is represented as $h_{ij}$) are independent circularly-symmetric complex Gaussian random variables with unit variance, that is, $h_{ij} \sim \mathcal{CN}(0,1)$. The entries of the channel matrix can be normalized as $\mathbb{E}\{|h_{ij}|^2\} = 1$. It is also assumed that the elements of the noise vector n are independent and identically distributed circularly-symmetric complex Gaussian variables with variance on per complex entry, that is, $n_i \sim \mathcal{CN}(0, \sigma_n^2)$.

If the ith (1≤i≤M) row of H is represented as $h_i.$, then Formula (1) can be re-written as:

$$\begin{pmatrix} y_1 \\ y_2 \\ \vdots \\ y_M \end{pmatrix} = \begin{pmatrix} h_{1.} \\ h_{2.} \\ \vdots \\ h_{M.} \end{pmatrix} \begin{pmatrix} x_1 \\ x_2 \\ \vdots \\ x_N \end{pmatrix} + \begin{pmatrix} n_1 \\ n_2 \\ \vdots \\ n_M \end{pmatrix} \quad (2)$$

where the precoded signals $x = (x_1, x_2, x_N)^T$ correspond to the signals on N transmitting antennas, and the received signals $y = (y_1, y_2, \ldots y_M)^T$ correspond to the received signals of the M single-antenna UEs. The channel vectors $h_1., h_2., \ldots h_M.$ are row vectors of the channel matrix H, each corresponding to a channel vector of one single-antenna UE. The noise vector $n = (n_1, n_2, \ldots n_M)^T$ correspond to the noises on the received signals of the M single-antenna UEs.

As shown, the precoding at the BS 205 transforms the intended or desired signals s to the precoded signals x such that the elements in y can be correctly decoded at the UEs as the appropriate symbols in the desired signal vector s, that is, $y_i \approx s_i$ (1≤i≤M) if the total signal gain is 1. If the infinite-resolution DACs are used, the elements in the precoded signals x can come from the entire complex field $\mathbb{C}$. While for the low-resolution DACs, the elements can only be selected from a finite set $\mathcal{L} = \{\ell_0, \ell_1, \ldots \ell_{2^L-1}\}$, where $\ell_i$ (0≤i≤$2^L$−1) represents a quantization level and L represents the number of quantization bits per real dimension.

If x includes complex signals with infinite resolution, the quantization of x would discretize x to discrete signals. If x includes simple sinusoidal signals, the L-bit quantization of x would result in the L-bit quantized signal as shown in FIG. 1.

In a 1-bit quantization case, for a real or imagery part of a complex number, the quantization levels are only two, that is $\mathcal{L} = \{\pm 1^{1b}\}$, where $1^{1b} = \sqrt{P/(2N)}$ is determined by the total transmitting power P and the number of antennas N at the BS 205. For the purpose of generalization, the average amplitude $\overline{A} = \sqrt{P/N}$ is extracted as a normalization factor. Then, the 1-bit quantization levels are represented as $$\pm \frac{1}{\sqrt{2}} \overline{A}.$$

In a L-bit quantization case where L>1, the quantization levels per real dimension would be $2^L$. There are several approaches to set the quantization levels. One approach is to find a group of quantization levels which can minimize the distortion between a quantized vector and a non-quantized vector. Table 1 shows example quantization levels for 1-5 bits.

TABLE 1

| Bits | 1 | 2 | 3 | 4 | 5 |
|---|---|---|---|---|---|
| Quantization Base | $\zeta$ = 0.70710678$\overline{A}$ | $\zeta$ = 0.37508856$\overline{A}$ | $\zeta$ = 0.21125073$\overline{A}$ | $\zeta$ = 0.11914304$\overline{A}$ | $\zeta$ = 0.06674466$\overline{A}$ |
| Quantization Levels | ±$\zeta$ | ±$\zeta$, ±3$\zeta$ | ±$\zeta$, ±3$\zeta$, ±5$\zeta$, ±7$\zeta$ | ±$\zeta$, ±3$\zeta$, ±5$\zeta$, ±7$\zeta$, ±9$\zeta$, ±11$\zeta$, | ±$\zeta$, ±3$\zeta$, ±5$\zeta$, ±7$\zeta$, ±9$\zeta$, ±11$\zeta$, |

TABLE 1-continued

| Bits | 1 | 2 | 3 | 4 | 5 |
|------|---|---|---|---|---|
|      |   |   |   | ±13ζ, ±15ζ | ±13ζ, ±15ζ, ±17ζ, ±19ζ, ±21ζ, ±23ζ, ±25ζ, ±27ζ, ±29ζ, ±31ζ |

As shown, the quantization levels are integral multiples of the base level $\zeta$. The base level $\zeta$ is determined according to the power P and the number of antennas N at the BS 205.

Once the quantization levels are determined, the quantization function can be used to quantize the signals. For the purpose of simplicity, it is assumed that the quantization base level is 1, that is, $\zeta=1$. Then, for a real part $x_R$ or imaginary part $x_I$ of the signals x, a quantization function $Q_r(\bullet)$ is defined.

For 1-bit quantization, the quantization function is represented as $Q_r(x_R)=\text{sgn}(x_R)$, where $\text{sgn}(\bullet)$ represents a signum function that is applied element-wise to the vectors and defined as:

$$\text{sgn}(a) = \begin{cases} 1, & a \geq 0 \\ -1, & a < 0 \end{cases} \quad (3)$$

For L-bit quantization, the quantization function can be constructed by the signum function. The quantization function for the real part can be expressed as below.

$$Q_r(x_R) = \Sigma_{i=1-2^{(L-1)-1}} \text{sgn}(x_R + 2i) \quad (4)$$

The quantization function for the imagery part is similar. Combined with the quantization base level as mentioned above, the L-bit quantization function $Q(\bullet)$, also named as a quantizer-mapping function, for the complex signals x can be expressed as below.

$$Q(x) = \zeta(Q_r(x_R/\zeta) + jQ_r(x_I/\zeta)) \quad (5)$$

Figure 3:
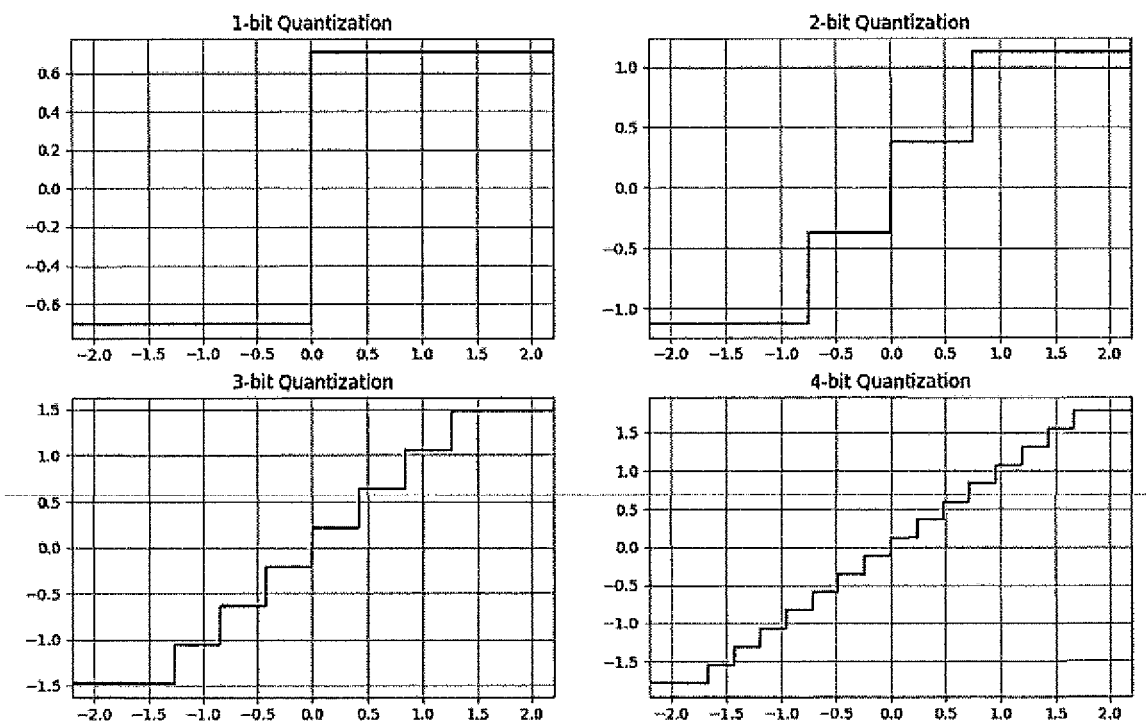
FIG. 3 illustrates example curves of a quantization function with different bits.

The real and imaginary parts of the quantization function have the same curves. Example curves of the quantization function with 1-4 bits are shown in FIG. 3.

If the low-resolution DACs are used, the signals on the antennas would be quantized signals, which have only a few quantized levels as shown in FIG. 1. It is desired that the received signals at UE sides have few distortions even when the signals on antennas at a BS side are quantized. It would be better that the lower DAC resolutions at the BS side would have no effects on the UE sides. This is a great challenge for precoding designs.

Currently, there are two types of quantized precoding schemes, where one is called a linear-quantized precoding scheme and the other is called a nonlinear-quantized precoding scheme. Linear-quantized precoders perform linear precoding followed by quantization of the elements of the precoded vector to the finite transmit set L. If W represents a linear precoding matrix, the precoded signal x would be obtained by the following formula:

$$x = Q(Ws) \quad (6)$$

where $Q(\bullet)$ represents the quantizer-mapping function as mentioned above, which is a nonlinear function that describes a quantization operation of the DACs at the BS. A conventional linear-quantized precoding scheme is a zero forcing (ZF) quantized (ZFQ) precoding scheme, which performs a ZF precoding before the quantization operation. The ZF precoding matrix, represented as $W_{zf}$, can be calculated as below:

$$W_{zf} = \frac{1}{\beta_{zf}} H^H (HH^H)^{-1} \quad (7)$$

$\beta_{zf}$ represents a precoding factor and is normally set as $$\beta_{zf} = \frac{1}{\sqrt{P}} \sqrt{tr((HH^H)^{-1})}$$

where P represents the total transmitting power as mentioned above, $tr(\bullet)$ represents the trace of a matrix, and $H^H$ represents the conjugate transpose of the channel matrix H. Then, the ZFQ precoding can be implemented by $x=Q(W_{zf}s)$.

The linear quantized precoding schemes such as the ZFQ precoding scheme are designed under the assumption of the infinite-resolution DACs. These schemes cannot function well in the case of using the low-resolution DACs. Compared to nonlinear-quantized precoders, the linear-quantized precoders often have a lower complexity, but poorer detection performance due to the nonlinear distortion caused by the quantization.

A 1-bit quantized precoding scheme as a special case of the quantized precoding has been studied to mitigate the performance degradation when 1-bit DACs are used to minimize the energy consumption of the DACs. So far, most nonlinear-quantized precoders are designed specifically for the 1-bit quantized precoding case and difficult to be generalized.

The optimization of the L-bit nonlinear-quantized precoding can be formulated as follows:

$$\min_{x \in \mathcal{L}^N, \beta \in \mathbb{R}} \|s - \beta Hx\|_2^2 + \beta^2 M \sigma_n^2 \text{ subject to } \beta > 0 \quad (8)$$

where $\beta$ represents a normalized factor (also referred to as a precoding factor), generally a real number, and $\|\bullet\|_2$ represents 2-norm of a vector. Since the optimization problem is solved for a given signal vector s, the precoding factor $\beta$ also depends on s. This is different from the linear-quantized precoding where $\beta$ only depends on the channel matrix H.

For the case of using the 1-bit DACs, one algorithm named squared-infinity norm Douglas-Rachford splitting (SQUID) is used to solve the aforementioned optimization problem approximately. It appears that the SQUID algorithm can find a near-optimal solution to the 1-bit quantized precoding problem with a Quadrature Phase Shift Keying (QPSK) modulation. This algorithm can achieve performance comparable to semidefinite relaxation (SDR), which is an algorithm with more computational complexity.

For a low-order modulation such as QPSK, the UEs do not need to scale the received signal by a scaling factor when decoding the signals. While for a high-order modulation such as 16 Quadrature Amplitude Modulation (16QAM) or 64QAM, the scaling factor is necessary. In this case, the optimization problem is modified as:

$$\min_{X \in \mathcal{L}^{N \times T}, \beta \in \mathbb{R}} \|S - \beta HX\|_F^2 + \beta^2 MT\sigma_n^2 \text{ subject to } \beta > 0 \quad (9)$$

where T represents the number of time slots, and $\|\cdot\|_F$ represents the Frobenius norm of a matrix. In Formula (9), S and X are all matrices with T columns corresponding to T time slots. A single value of $\beta$ is chosen for a block of transmit symbols S with a length T that does not exceed the channel coherence time. Before applying the SQUID algorithm, Formula (9) is rewritten as:

$$\min_{x \in \mathcal{L}^{NT}, \beta \in \mathbb{R}} \|\bar{s} - \beta \overline{H}\bar{x}\|_2^2 + \beta^2 MT\sigma_n^2 \text{ subject to } \beta > 0 \quad (10)$$

where $\bar{s}$ and $\bar{x}$ represent the vectorized versions of the signal matrices S and X, and $\overline{H} = I_T \otimes H$ represents the Kronecker product of an identity matrix $I_T$ and the channel matrix H. Based on Formula (10), a single value of $\beta$ can be calculated for the intended or desired signal matrix S. Such vectorization allows the UEs to estimate $\beta$ through pilot transmissions or blind estimation techniques. However, the dimension of matrix-vector multiplication would be increased, and therefore the computational complexity would be increased a lot.

Another algorithm to solve the optimization problem is named biConvex 1-bit PrecOding (C1PO). This algorithm relies upon biconvex relaxation (BCR) and can converge to a near-optimal solution much faster. To avoid the matrix inversions, a low-complexity version of C1PO, called C2PO, is proposed. It seems that the C2PO algorithm can achieve performance that is approaching the performance of the SQUID algorithm, but has lower computational complexity.

Nowadays, a Gradient Descent (GD) based precoding scheme is proposed for the massive MIMO systems. This scheme combines Stochastic Gradient Descent (SGD) based precoding and scaled clipping (also called a SGD-Clip scheme) to implement the 1-bit precoding with low-order modulations such as QPSK. The SGD-Clip scheme seems to achieve the similar performance with the SQUID algorithm for QPSK modulation.

In the case of using the low-resolution DACs, a universal framework for quantized precoding, called iterative discrete estimation (IDE), is proposed which is based on the alternating direction method of multipliers (ADMM) framework. To avoid the matrix inversions, a low-complexity version of IDE, called IDE2, is proposed. IDE2 can provide good trade-off between complexity and error-rate performance and thus be more suitable than IDE for the massive MIMO systems.

The optimization of the 1-bit quantized precoding as a special case of the L-bit quantized precoding may be simplified. However, 1-bit precoders often have poor performance for high-order modulations such as 64QAM and 256QAM. In contrast, L-bit precoders (with 2 or more bits) can achieve much better performance than 1-bit precoders, especially for high-order modulations. Thus, general L-bit quantized precoders would be desired for the massive MIMO systems with low-resolution DACs. However, L-bit quantized precoding is much more complicated than 1-bit precoding. It would a big challenge to achieve a balance between performance and computational complexity. The low-complexity schemes often have the poor detection performance, while the schemes having the high detection performance often have the high complexity.

Example embodiments of the present disclosure provide an efficient quantized precoding scheme. With this precoding scheme, a normalized factor (or a precoding factor) for precoding of an original signal is obtained first at a transmitter which may be configured with a plurality of physical or logical transmitting antennas. The normalized factor may be set as an empirical value. In some example embodiments, the normalized factor may be determined based on a power of a plurality of signals intended for a plurality of receivers. Each of the receivers may be configured with at least one receiving antennas.

Once the normalized factor is determined, the precoding scheme focuses on precoding of the intended or desired signals. With the precoding scheme, the following acts are performed iteratively. First, a descending direction (for example, a gradient) is determined using the normalized factor. The descending direction indicates a direction in which a difference between the plurality of intended signals and the corresponding received signals at the receivers decreases very fast. For example, a descending rate of the difference in the descending direction is above a threshold rate. Accordingly, a plurality of precoded signals is determined based on the descending direction. After some iterations, the precoded signals will converge to the optimal solution. Then, the precoded signals are quantized for transmission by the transmitter to the plurality of receivers.

The precoding scheme according to some embodiments of the present disclosure, the normalized or precoding factor need not to depend on the signal to be transmitted and can be stable during a period of time such as different time slots. This can lower the computational complexity of the precoding at the transmitter on one hand. On the other hand, the estimation of the normalized factor may be simplified at a receiver, and therefore the detection performance of the original signal may be improved at the receiver.

Compared to the conventional precoding approaches, the proposed precoding scheme has a lower complexity and better detection performance. The detection performance and the complexity are well balanced. Moreover, for high-order modulations, it is not necessary to vectorize the signal matrices, thus avoiding lifting the matrix-vector multiplication to higher dimensions. In addition, this quantized precoding scheme is not specified for the 1-bit precoding, but can be used for the general L-bit quantized precoding. This scheme is a universal quantized precoding scheme for the massive MIMO systems with low-resolution DACs.

For example, the proposed precoding scheme has the following advantageous benefits:
   High performance: it outperforms the conventional linear and nonlinear quantized precoders on the detection performance.
   Low complexity: the proposed precoding scheme has a low complexity.
   High generality: it is a universal quantized precoding scheme, not specified for 1-bit precoding, but can be used in general L-bit quantized precoding or finite-alphabet precoding cases.
   Low dimensions: it avoids vectorizing of the signal vector and the channel matrix to higher dimensions for high-order modulations, thus reducing the computations a lot by keeping matrix-vector multiplication in low dimensions.
   High flexibility: various Gradient Descent (GD) algorithms such as Batch Gradient Descent (BGD), Stochastic Gradient Descent (SGD) or mini-batch GD can be used to get satisfactory performance.
   Profit from Artificial Intelligence (AI) domain: The BGD algorithms are basic algorithms in machine learning (ML) areas, and rapid developments of these algorithms in the AI domain may facilitate the implementation of the BGD based quantized precoding scheme.

As a result, the precoding scheme according to example embodiments of the present disclosure is very attractive for practical massive MIMO systems, especially, with low-resolution DACs.

Figure 4:
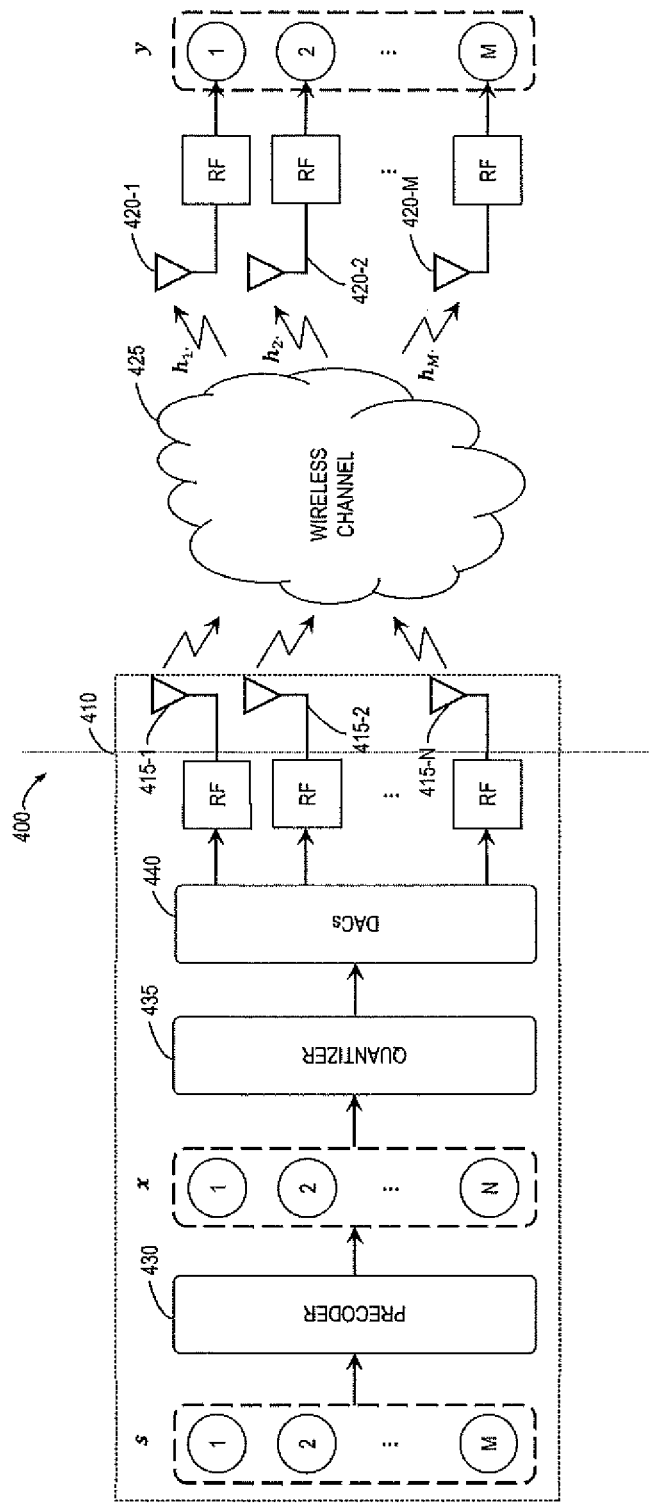
FIG. 4 illustrates an example environment in which example embodiments of the present disclosure can be implemented.

FIG. 4 shows an example environment 400 in which example embodiments of the present disclosure can be implemented.

The environment 400 includes a transmitter 410 provided with a plurality of transmitting antennas 415-1, 415-2, . . . , 415-N. These transmitting antennas may comprise physical or logical antennas. The environment 400 also includes a plurality of receivers. In this example, each of the plurality of receivers is provided with a receiving antenna 420-1, 420-2, . . . , 420-M. N and M are any suitable positive integer. In some example embodiments, N≥M.

The transmitter and receivers form a part of a MIMO or massive MIMO system. It is to be understood that each receiver is configured with one receiving antenna only for the purpose of illustration, without suggesting any limitation. In some example embodiments, one receiver may be provided with a plurality of receiving antennas. It is also to be understood that the environment 400 may include any suitable number of transmitters and receivers adapted for implementing embodiments of the present disclosure.

The transmitter and receiver can be implemented by or as a part of any suitable device. In some example embodiments, the transmitter may be implemented at a network device such as a base station, and the receiver may be implemented at a terminal device such as a UE. It is also possible that the transmitter is implemented at a terminal device and the receiver is implemented at a network device. In some example embodiments, the environment 400 may be a part of a relay communication network. In this example, the transmitter may be implemented at a network device, and the receiver may be at a relay, and vice versa. In some other embodiments, the transmitter and the receiver may be both implemented at terminal devices in device-to-device (D2D) communications, which may be alternatively referred to as sidelink, or vehicle to everything (V2X).

As shown, the transmitter and the receiver can communicate over a wireless channel 425. The communication may follow any suitable communication standards or protocols, which are already in existence or to be developed in the future, such as Universal Mobile Telecommunications System (UMTS), Long Term Evolution (LTE), LTE-Advanced (LTE-A), the fifth generation (5G) New Radio (NR), Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, machine type communication (MTC), enhanced Machine Type Communication (eMTC), enhanced mobile broadband (eMBB), massive machine type communication (mMTC), ultra-reliable low latency communication (URLLC), Carrier Aggregation (CA), Dual Connection (DC), and New Radio Unlicensed (NR-U) technologies. In some example embodiments, the MIMO technology such as single-user MIMO (SU-MIMO) and multi-user MIMO (MU-MIMO) technologies may be used for the communications in the environment 400.

In various example embodiments, the transmitter 410 performs quantized precoding. As shown, the transmitter 410 comprises a precoder 430 for precoding a plurality of signals, represented by s, to a plurality of precoded signals represented by x. The transmitter 410 also comprise, a quantizer 435 to quantize the precoded signals x. Then, the quantized precoded signals are processed at DACs 440 before transmission by the transmitting antennas 415-1, 415-2, . . . , 415-N to the plurality of receiving antennas 420-1, 420-2, . . . , 420-M.

In this example, as shown, the number M of intended signals (that is, the number of elements in the signal vector s) is equal to the number of receiving antennas. It is also possible that the number M of intended signals is less than the number of receiving antennas. For example, if a receiver, implemented by a UE, has two receiving antennas, the transmitter 410, implemented by the BS, can transmit one stream to the receiver. Thus, the receiver can combine two received signals of the two receiving antennas to recover the intended signal stream.

In this case, the channel matrix H would also be the equivalent channel matrix, to cause s and Hx to have the same dimension. This equivalent channel matrix would be coefficients between the combined signals of the specific receiver (that combines the received signals from its multiple antennas) and the transmitting antennas. Such a receiver, which may be implemented by a multi-antenna UE to receive one stream, may be equivalent to a virtual single-antenna UE.

Figure 5:
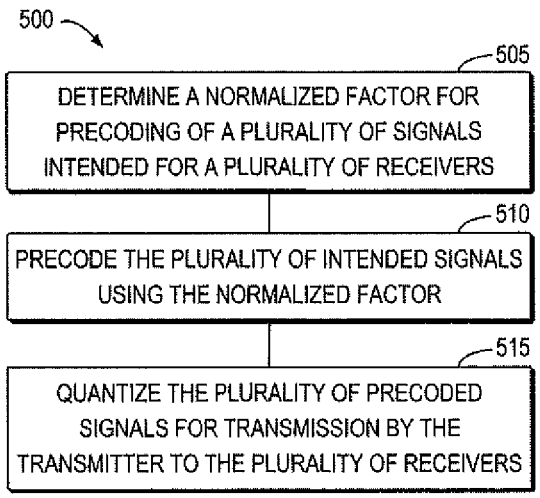
FIG. 5 illustrates an example method according to some example embodiments of the present disclosure.

FIG. 5 shows an example method 500 according to some example embodiments of the present disclosure. The method 500 can be implemented by the transmitter 410 as shown in FIG. 4. For the purpose of discussion, the method 500 will be described with reference to FIG. 4.

At block 505, the transmitter 410 determines a normalized factor, represented by β, for precoding of a plurality of signals (represented by s) intended to the plurality of receivers provided with the plurality of receiving antennas 420-1, 420-2 . . . 420-M. The normalized factor β may be determined in any suitable way. As discussed above, the linear precoders may use such normalized or precoding factors. In some example embodiments, the normalized factor β may be determined from the precoding factor $β_{zf}$ for the zero-forcing precoder.

For example, a precoded signal vector with infinite resolution is represented as $x_{inf}$, and expectation of the total transmitting power is P, that is, $\mathbb{E}[\|x_{inf}\|_2^2]=P$. $x_{inf}$ is quantized with L-bit resolution to a quantized signal vector $x_q$ with the constraint that $\|x_q\|_2^2=P$. If the samples $x_{inf}$ comply with Gaussian distribution, according to Bussgang theorem:

$$x_q = Q(x_{inf}) = \tau x_{inf} + d \tag{11}$$

where d represents a distortion term, and a Bussgang constant or quantization constant τ can be calculated as below.

$$\tau = \frac{\mathbb{E}[x_q^H x_{inf}]}{\mathbb{E}[x_{inf}^H x_{inf}]} \tag{12}$$

The value of τ is determined by the quantization resolution, and its values for 1-5 bit quantization are listed in Table 2.

TABLE 2

| Bit(s) | 1 | 2 | 3 | 4 | 5 |
|---|---|---|---|---|---|
| τ | 0.79788456 | 0.93869799 | 0.98110158 | 0.99421180 | 0.99825082 |

As shown in Table 2, for 1-2 bit quantization, the value of τ is significantly less than 1. When the resolution is larger than 3 bits, the value of τ would get closer to 1.

When the precoding factor $\beta_{zf}$ for the ZF-quantized precoder is used to normalize the average power of $x_{inf}$ as P, a ZF precoded signal vector $x_{inf}=W_{zf}s$. Then, the linear-quantized signal vector $x_q$ can be expressed as below.

$$x_q = Q(x_{inf}) = \tau W_{zf} s + d = \frac{1}{\tau^{-1}\beta_{zf}} H^H (HH^H)^{-1} s + d \quad (13)$$

Regardless of the distortion term d, $\tau^{-1}\beta_{zf}$ can be treated as the precoding factor of the ZF-quantized precoder. Accordingly, the normalized factor β for nonlinear-quantized precoders may be determined as the product of $\tau^{-1}$ and $\beta_{zf}$ (or similar to $\beta_{zf}$). As discussed above, $$\beta_{zf} = \frac{1}{\sqrt{P}} \sqrt{tr((HH^H)^{-1})}.$$

$\beta_{zf}$ (or similar to $\beta_{zf}$) often depends on the channel matrix H, and $\tau^{-1}$ does not depend on the channel matrix H or transmitting signals.

In order to reduce the complexity due to the matrix inversion operation of the channel matrix H in determining the precoding factor of the linear precoder such as $\beta_{zf}$, in some example embodiments, the normalized factor β may depend on a transmitting power of the transmitter, instead of the channel matrix H, and the quantization constant T. For example, the normalized factor β may be calculated as below:

$$\beta = \frac{1}{\tau} \sqrt{\frac{ME_s}{P(N-M)}} \quad (14)$$

where $E_s = \mathbb{E}[|s_i|^2]$ represents the average symbol energy of the intended signals s. Thus, β can be calculated with less computation.

In some example embodiments, signal-to-noise ratio (SNR) may also be considered in the determination of the normalized factor β to further improve the precoding efficiency. For example, if the SNR is represented as $$\rho = \frac{P}{\sigma_n^2}$$

where $\sigma_n^2$ represents a variance of the noises, then the normalized factor β would be calculated as below.

$$\beta = \frac{1}{\tau} \sqrt{\frac{ME_s}{P(N-M)}} \sqrt{\frac{\rho}{\rho+1}} \quad (15)$$

After the normalized factor β is determined, at block 510, the transmitter 410 precodes the plurality of intended signals s using the normalized factor β.

For example, Formula (8), which describes the quantized precoding problem, may be approximated as:

$$\min_{x \in \mathcal{L}^N} \left\| \frac{1}{\beta} s - Hx \right\|_2^2 \text{ subject to } \beta > 0 \quad (16)$$

β and x are both unknown in this problem. It is quite complicated to seek both of the optimal precoding factor and the optimal precoded signal simultaneously, thus making the computation complexity quite high. Given the normalized factor β, the optimization problem becomes finding the optimal solution x, which therefore becomes less complicated.

The BGD algorithm is widely used in the machine learning (ML) area due to its low complexity. The BGD algorithm may be used for optimization problems, especially a convex optimization problem. In some example embodiments, once the normalized factor β is determined, the BGD algorithm can be used in the precoding of the intended signals s to find the optimal solution x, which has low complexity and is quite easy to implement.

An example precoding process will be discussed below with reference to FIG. 6. It is supposed that the intended signal vector s and the channel matrix H are already known. Then, with an initial solution x, such as a zero vector, the optimization process can be implemented iteratively by the following steps.

First, at block 605, the transmitter 410 uses the normalized factor β to determine a descending direction of a difference between the plurality of intended signals s and the corresponding signals received by the plurality of receivers, for example, at the plurality of receiving antennas 420-1, 420-1, . . . , 420-M. In the descending direction, a descending rate of the difference is above a threshold rate. That is, the different decreases very fast. The threshold rate may be the fastest descending rate (or a faster descending rate) during one iteration number.

The descending direction may be determined by setting derivation of a cost function to zero. For example, the descending direction may be indicated by a gradient vector, represented by g. In the example embodiments where the BGD algorithm is used, based on Formula (16), the gradient vector g can be derived by setting the derivative of $$\left\| \frac{1}{\beta} s - Hx \right\|_2^2$$

to zero, as below:

$$g = H^H \left( \frac{1}{\beta} s - Hx \right) = \frac{1}{\beta} H^H s - H^H Hx \quad (17)$$

Then, at block 610, the precoded signals x are determined along the descending direction, represented by the gradient vector g. For example, x=x+ηg where η represents an update step size such as a learning rate.

In some example embodiments, an accumulated descending direction is used to determine the precoded signals x. The accumulated descending direction is also referred to as a momentum, represent as m, which represents the tendency of the gradient descent. The momentum m (initialized as a zero vector) is updated as below:

$$m = \alpha m + g \quad (18)$$

where α represents a predetermined accumulating rate.

The accumulating rate a may be an empirical value. In some example embodiments, the accumulating rate a is calculated as below.

$$\alpha = 0.75 - \exp\left(-0.29\frac{N}{M}\right) \quad (19)$$

where exp(•) represents an exponential function.

The precoded signals x will then be updated as x=x+ηm.

The update step size or learning rate 1 may be set as an auto-calculated value as below:

$$\eta = \frac{s^H H H^H s}{s^H H (H^H H) H^H s} = \frac{\|H^H s\|_2^2}{\|H H^H s\|_2^2} \quad (20)$$

In some example embodiments, the channel quality information about the wireless channel 425 may be considered when calculating the update step size. For example, the update step size may be calculated as below:

$$\eta = \frac{s^H H H^H s}{s^H H \left(H^H H + \frac{M\sigma_n^2}{P} I\right) H^H s} = $$

$$\frac{\|H^H s\|_2^2}{\|HH^H s\|_2^2 + \frac{M\sigma_n^2}{P}\|H^H s\|_2^2} = \left(\frac{\|HH^H s\|_2^2}{\|H^H s\|_2^2} + \frac{M\sigma_n^2}{P}\right)^{-1} \quad (21)$$

The calculation of the update step size 1 is quite flexible. The auto-calculated update step size or learning rate during iterations may facilitate the convergence into the optimal solution x, thereby further reducing the total complexity.

Figure 7:
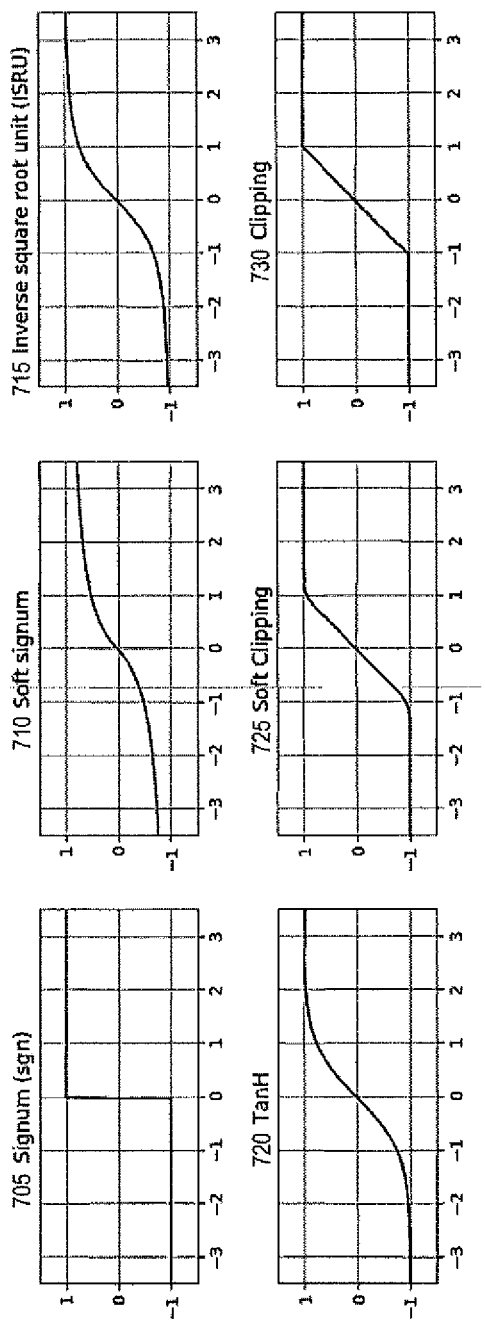
FIG. 7 illustrates example curves of different activation functions according to some example embodiments of the present disclosure.

In some example embodiments, a function is used for the determination of the precoded signals x, to further reduce the distortion caused by the quantization. Any suitable activation function in the ML areas may be applied. In some example embodiments, the activation function may comprise a monotonically increasing, odd symmetric and saturating function with curves as shown in FIG. 7.

A signum function 705 may be used for determining the precoded signals x, as shown in Formula (4). As candidates to replace the signum function 705, there are many activation functions in the machine learning areas which have similar curves with the signum function. For example, a soft signum function 710, an inverse square root unit (ISRU) function 715, a tan h function 720, a soft clipping function 725 and a clipping function 730 as shown in FIG. 7 all have similar curves with the signum function 705.

In some example embodiments, the soft clipping function 725 or the clipping function 730 is used as an activation function. The soft clipping function 725 may be expressed as below:

$$softclip(a; p, q) = \frac{1}{p}\ln\left(\frac{\exp(pqa) + \exp(-p)}{\exp(pqa - p) + 1}\right) \quad (22)$$

where p and q are internal parameters of the soft clipping function 725. The parameter p controls the similarity between the soft clipping function 725 and the clipping function 730, and the parameter q controls the slope. When p becomes large enough, the soft clipping function 725 would become the clipping function 730, which is expressed as below.

$$clip(a;q) = \min(\max(-1, qa), 1) \quad (23)$$

where q is the internal parameter of the clipping function 730, which controls the slope. When q→∞, the clipping function 730 would become the signum function 705, that is, clip(a; ∞)≡sgn(a). The use of the clipping function 730 may further simplify the computational complex.

When the activation function is applied, the precoded signals x may be updated as:

$$x = \tilde{Q}(x + \eta m) \quad (24)$$

where $\tilde{Q}(\bullet)$ represents an approximate quantization function based on an activation function.

In the case that the clipping function 730 is used as the activation function, the approximate quantization function for a real part of the precoded signals x can be constructed as below.

$$\tilde{Q}_r(x_R) = \Sigma_{i=1-2^{(L-1)}}^{(L-1)-1} \text{clip}(x_R + 2i; q) \quad (25)$$

The approximate quantization function for an imaginary part is similar as Formula (25).

Then, combined with the quantization base level as mentioned above, the final approximate quantization function would be expressed as below.

$$\tilde{Q}(x) = \zeta(\tilde{Q}_r(x_R/\zeta) + j\tilde{Q}_r(x_I/\zeta)) \quad (26)$$

Figure 8:
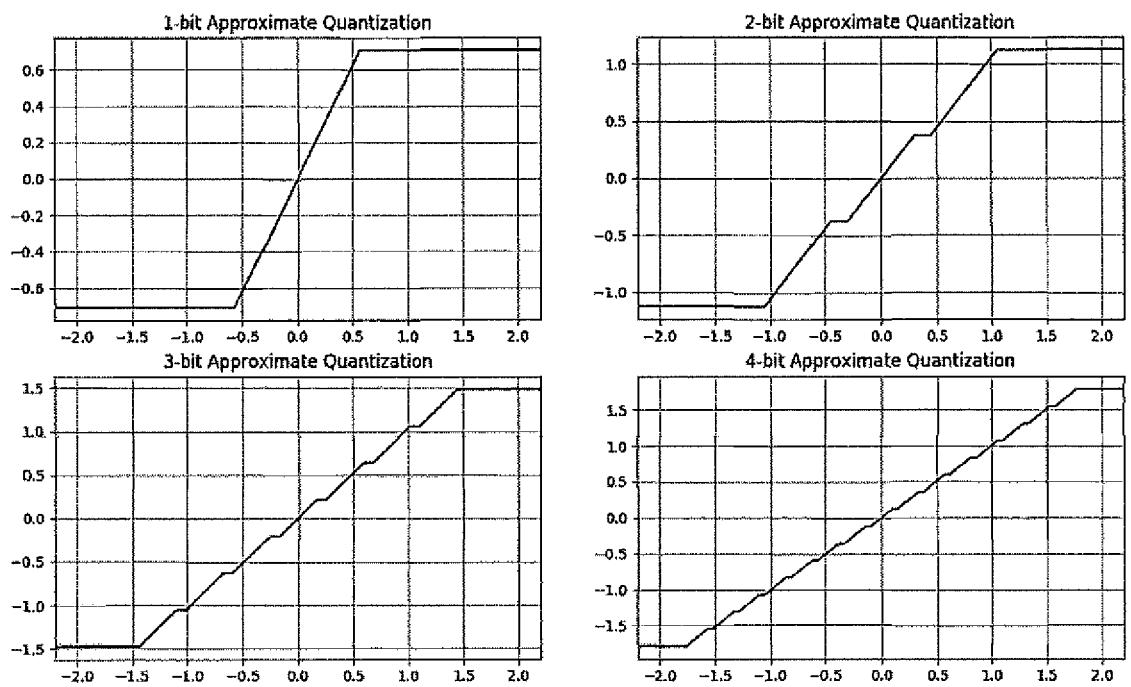
FIG. 8 illustrates example curves of a real or imaginary part of an approximate quantization function according to some example embodiments of the present disclosure.

FIG. 8 shows example curves of a real or imaginary part of the approximate quantization function according to some example embodiments of the present disclosure. The real and imaginary parts have the same curves. As shown, compared with the curves of the quantization functions as shown in FIG. 3, the slopes of the lines between two flat steps are not ∞ but q. q may be set as an empirical value. In some example embodiments, q=1.25.

In addition to the clipping function 730, other functions, such as the soft signum function 710, the inverse square root unit (ISRU) function 715, the tan h function 720 and the soft clipping function 725, having similar curves with the signum function can also be used. With proper parameter settings, satisfactory detection performance may be achieved.

In some example embodiments, the normalized factor β may be updated or refined after a number of iterations to improve the convergence. Still with reference to FIG. 6, after the determination of the descending direction (represented by g) and the determination of the plurality of precoded signals x are performed iteratively for a predetermined times, at block 615, the normalized factor β may be updated based on the precoded signals x.

For example, the normalized factor β may be updated as below:

$$\beta = \frac{\Re\{s^H Hx\}}{\|Hx\|_2^2} \qquad (27)$$

where $\Re\{\bullet\}$ denotes the real parts of the complex numbers.

The channel noises may be also considered in the updating. For example, the normalized factor η may be updated as below:

$$\beta = \frac{\Re\{s^H Hx\}}{\|Hx\|_2^2 + M\sigma_n^2} \qquad (28)$$

where $\sigma_n^2$ represents the variance of the noises.

Figure 6:
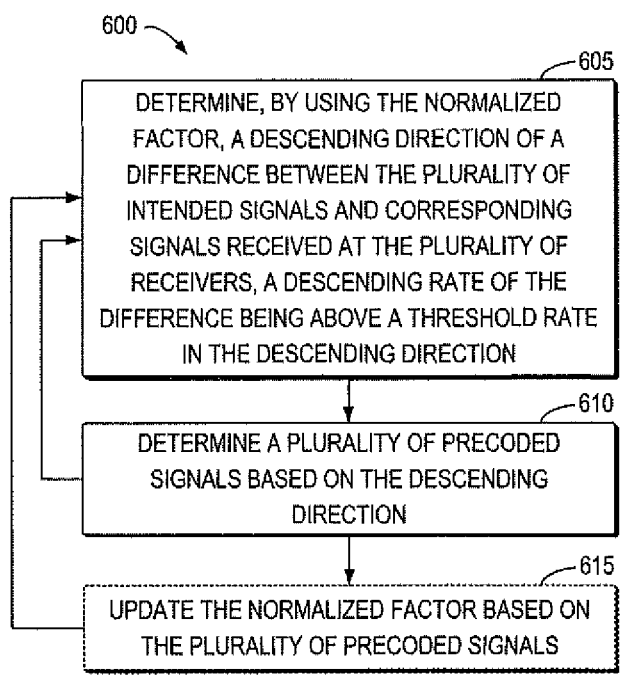
FIG. 6 illustrates an example precoding process according to some example embodiments of the present disclosure.

By iteratively performing the acts as shown in FIG. 6, the precoded signals x would finally converge to the optimal solution. The GD based quantized precoding scheme as shown in FIG. 6 is a universal framework for general quantized precoding, which has a high flexibility and extendibility. It can be applied to various finite-alphabet precoding problems.

In order to further extend the application of the quantized precoding scheme, in some example embodiments, the plurality of precoded signals x is further regularized. For example, the quantized precoding problem described in Formula (8) may be approximately converted as the following problem.

$$\min_{x \in \mathcal{L}^N} \left\|\frac{1}{\beta}s - Hx\right\|_2^2 + \frac{M\sigma_n^2}{P}\|x\|_2^2 \text{ subject to } \beta > 0 \qquad (29)$$

The constraint that $\|x\|_2^2 = P$ is used for the above formula. Compared with Formula (16), Formula (29) has a regularization item $$\frac{M\sigma_n^2}{P}\|x\|_2^2.$$

When using the regularization, the calculation of the gradient would be different as below:

$$g = H^H\left(\frac{1}{\beta}s - Hx\right) - \frac{M}{\rho}x \qquad (30)$$

where $\rho = P/\sigma_n^2$ represents the SNR. Other procedures can be the same as the quantized precoding procedure as discussed above without the regularization.

In addition to the BGD algorithm used to search the optimal algorithm, other GD algorithms like SGD and mini-batch GD can also be applicable. If other GD algorithms are adopted, the learning rate can be re-calculated to fit the specific GD algorithms.

The SGD algorithm is taken as an example. Compared with the BGD algorithm, the SGD algorithm has an inner loop (referred to as an epoch), iterated by the row of the channel matrix. In the kth iteration of the inner loop, the gradient would be:

$$g_k = H_k^H\left(\frac{1}{\beta}s_k - H_k x\right) \qquad (31)$$

The optimal learning rate for the kth iteration would be:

$$\eta_k = \frac{s_k^H H_k H_k^H s_k}{s_k^H H_k(H_k^H H_k) H_k^H s_k} = \frac{\|s_k\|_2^2 \|H_k\|_2^2}{\|s_k\|_2^2 \|H_k\|_2^4} = \frac{1}{\|H_k\|_2^2} \qquad (32)$$

Then, the solution can be updated by:

$$x = x + \eta_k g_k \qquad (33)$$

For each epoch (that is, one inner loop of iterations for SGD), the estimated solution can be approximately quantized once by $x = \tilde{Q}(x)$. If adopting the SGD algorithm to search the optimal solution, the determination of the batch gradient descent (or the BGD epoch) should be replaced by the SGD epoch as mentioned above.

Still with reference to FIG. 5, at block 515, the transmitter 410 quantizes the plurality of precoded signals x for transmission by the transmitter 410 to the plurality of receivers, for example, via the plurality of transmitting antennas 415-1, 415-2, . . . , 415-N and the plurality of receiving antennas 420-1, 420-2, . . . , 420-M. For example, the precoded signals x may be quantized as below:

$$x = Q(x) \qquad (34)$$

where $Q(\bullet)$ represents a L-bit quantization function.

Figure 9:
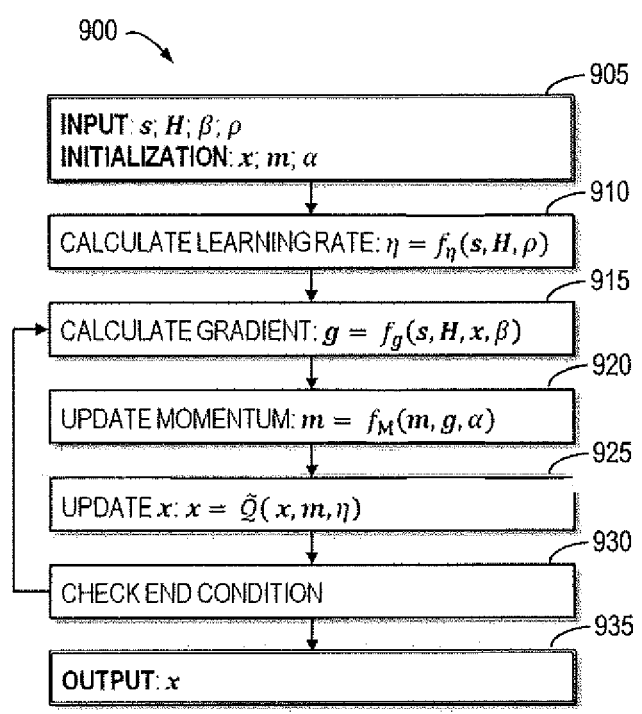
FIG. 9 illustrates an example process of Batch Gradient Descent (BGD) based quantized precoding according to some example embodiments of the present disclosure.

FIG. 9 shows an example process 900 of the BGD based quantized precoding algorithm according to some example embodiments of the present disclosure.

At block 905, some parameters such as s, H, β and ρ are inputted, and some parameters such as x, m and a are initialized. At block 910, the update step size (or the learning rate) η is calculated as $\eta = f_\eta(s, H, \rho)$. At block 915, the descending direction (or the gradient) g is calculated as $g = f_g(s, H, x, \beta)$. At block 920, the accumulated descending direction (or the momentum) m is calculated as $m = f_M(m, g, \alpha)$. At block 925, the precoded signals x is updated as $x = \tilde{Q}(x, m, \eta)$. At block 930, it is checked whether the end condition is satisfied. If the end condition is satisfied, the process 900 proceeds to block 930 where the precoded signals x is outputted. If the end condition is not satisfied, the process 900 returns to block 915 to calculate the gradient g again. Block 915, block 920 and block 925 will be iteratively implemented as long as the end condition is not satisfied.

Any suitable end condition may be used. In some example embodiments, a threshold iteration number may be used. If the number of iterations reaches the threshold iteration number, it is determined that the end condition is satisfied. In some other example embodiments, the end condition may be associated with the convergence level which may be indicated by a difference between the intended signals s and the received signals at the plurality of receiving antennas 420-1, 420-2, . . . , 420-M. For example, if the difference is below a threshold difference, it may be determined that the end condition is satisfied.

All operations and features as described above with reference to FIGS. 4-8 are likewise applicable to the process 900 and have similar effects. For the purpose of simplification, the details will be omitted.

Now, an example BGD based quantized precoding algorithm will be discussed.

Input:
  Signal vector s.
  Channel matrix H.
  Average symbol energy $E_s$.
  Total signal power P.
  SNR $\rho = P/\sigma_n^2$.
  Bits L.
Output:
  Precoded signal vector x.
Initialization:
  Set the maximum iteration number n, where 30 or more is OK.
  Set the learning rate η for optimized BGD using Formula (21).
  Set the empirical accumulating rate a for momentum calculation using Formula (19).
  Initialize the precoded signal vector x and the momentum m as zero vectors.
  Set Bussgang constant τ value according to bits L and Table 2.
  Set the normalized factor β using Formula (15).
  Set the precoding factor refinement interval J empirically, such as j=25 (where 10 to 30 is OK).
  Set the approximate quantization level ζ according to bits L and Table 1.
  Set the approximate quantization function using formula (26), where parameter q=1.25.
Main Routine:
  For t=1 to n
  #Step 1: Optimized batch gradient descent (approximate quantization is integrated)
  Calculate the gradient g using Formula (17).
  Update the momentum m by Formula (18).
  Update the precoded signal vector x using Formula (24).
  #Step 2: Normalized factor refinement
  If (t+1)% J=0, that is, t+1 in the set {J, 2J, 3J, . . . }:
    Update the normalized factor β using Formula (28).
  # End of the for loop
  Quantize the precoded signal vector x by change the elements of x to the nearest quantization level using Formula (34).
  Output the precoded signal vector x.
End of Optimized BGD Based Quantized Precoding Algorithm For each iteration of the above Optimized BGD (OBGD) algorithm, the computational complexity is only O(2NM). About 25~50 iterations are needed to converge, and the total complexity is quite lower than the conventional precoders. For example, for the 1-bit quantization case, the SQUID precoder with two loops has a computational complexity of $O(2(k_1 N^3 + k_2 N^2))$ where $k_1$ and $k_2$ are the iteration numbers of the two loops. The C2PO precoder has a computational complexity of $O(N^2)$ in each iteration. However, it is difficult to extend the C2PO precoder to the L-bit quantized precoding.

For general L-bit quantization case, the IDE2 precoder has the complexity of O(2NM) for each iteration, which is the same with the OBGD based quantized precoder. However, the IDE2 precoder often needs 50~100 iterations to have a satisfactory performance, the total complexity would be larger than the proposed scheme.

In addition, for high-order modulations, such as 16QAM, 64QAM and 256QAM, the SQUID, C2PO and IDE2 precoders need to vectorize the block of signal vectors and thus enlarge the channel matrix, which would further increase the computational complexity by $T^2$ for each iteration (T denotes the number of time slots). In contrast, the OBGD based quantized precoder does not need to vectorize the signal block or enlarge the channel matrix. Signal vectors in different time slots can be processed independently and in parallel. As such, the OBGD based quantized precoder would be much more practical than the conventional quantized precoders.

From the simulation results, the OBGD based quantized precoding scheme outperforms than the conventional precoding schemes. The comparison between the performances of the OBGD based quantized precoding scheme and the conventional precoding schemes are performed based on the simulations in various scenarios for different quantized precoders with 10,000 samples. For comparison, the detection performance of a ZF precoder with infinite-resolution (labelled by ZF-inf) is presented.

Two scenarios are considered in this simulation. In scenario 1, it is assumed that the receivers all know the symbol-level normalized or precoding factors. This scenario is unrealistic but provides a benchmark for detection performances. In scenario 2, the transmitter, implemented by a base station, transmits a pilot signal in the first time slot (T=10 time slots for each signal block), which is used to calculate the signal gains at the receivers. This is a practical scenario, which can provide a more reasonable estimation on the detection performances for different precoding schemes.

Simulation parameter settings are as below:
  Average Power is set as 1, that is, P=1.0;
  Modulations: BPSK, QPSK, 16QAM, 64QAM and 256QAM;
  Iterations for SQUID, C2PO, IDE2 and OBGD are 200, 50, 100 and 50.

In the one-bit quantization case, the performances of ZFQ, SQUID, C2PO, IDE2 and OBGD are compared for different scenarios and different antenna numbers. In scenario 1, the receivers are assumed to know the normalized factor (it is impossible for practical usage). In this ideal scenario, the ideal performances of the precoders are evaluated, and the uncoded BERs of different precoders are plotted in FIGS. 10 (a) to 10 (c).

Figure 10A:
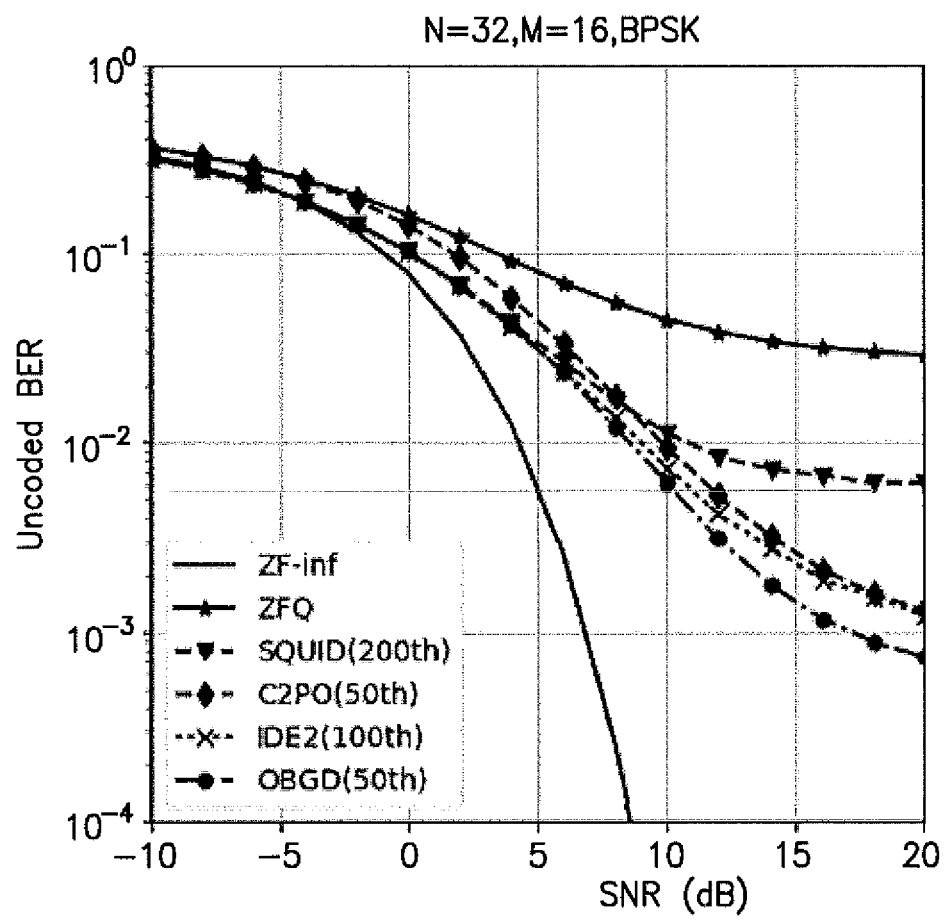
FIGS. 10 (a)-10 (c) illustrate example Bit Error Rate (BER) performances for different precoders in one scenario (referred to as Scenario 1) under a 1-bit case.
Figure 10B:
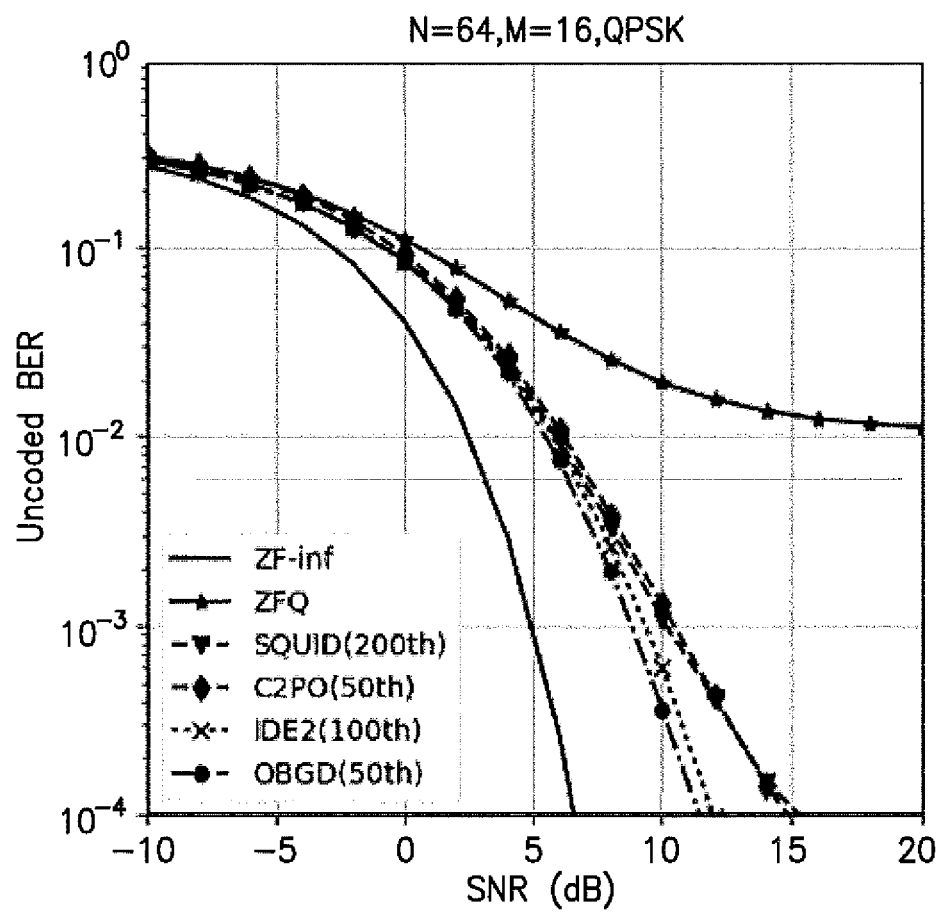
Figure 10C:
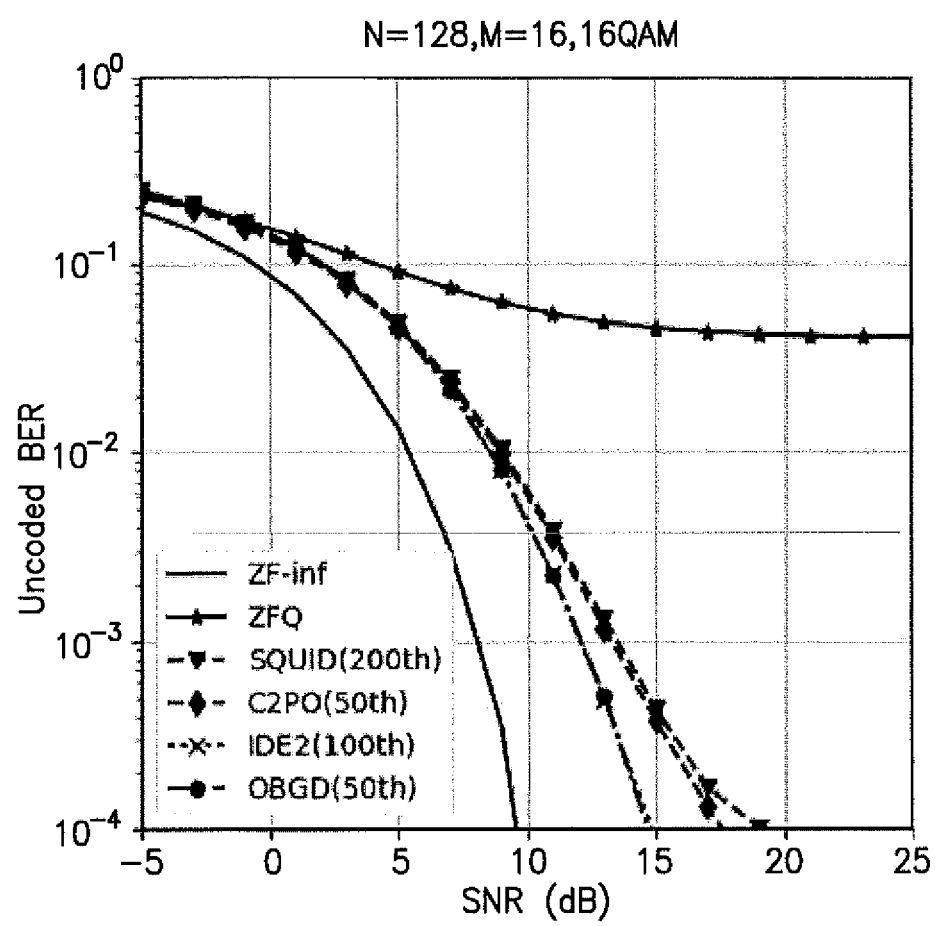
Figure 11A:
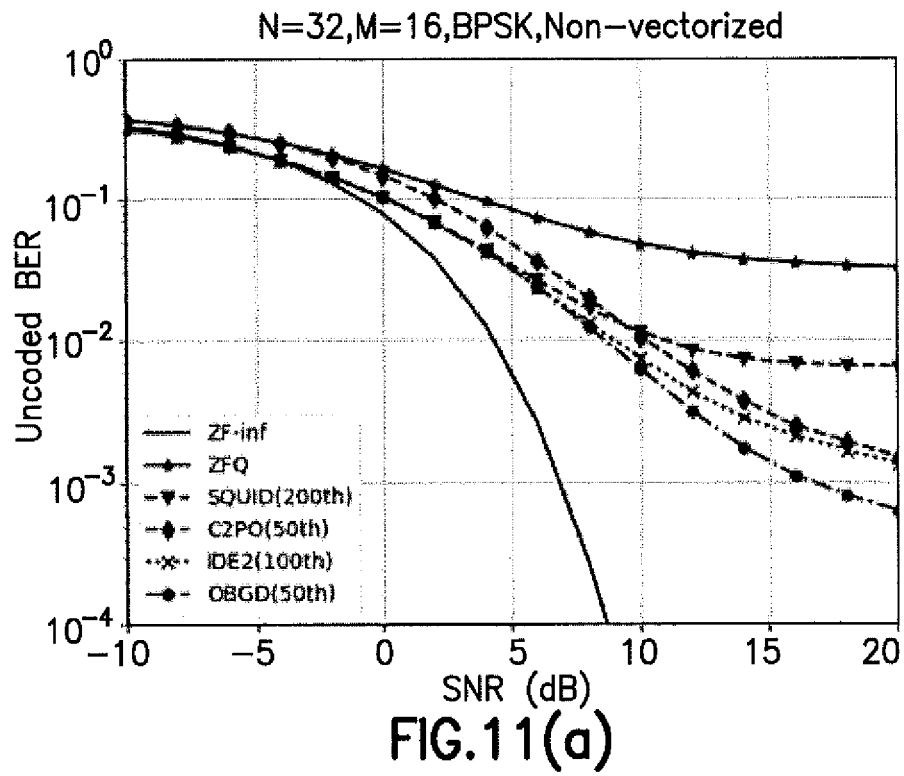
FIGS. 11 (a)-11 (f) illustrate example BER performances for different precoders in a further scenario (referred to as Scenario 2) under a 1-bit case.
Figure 11B:
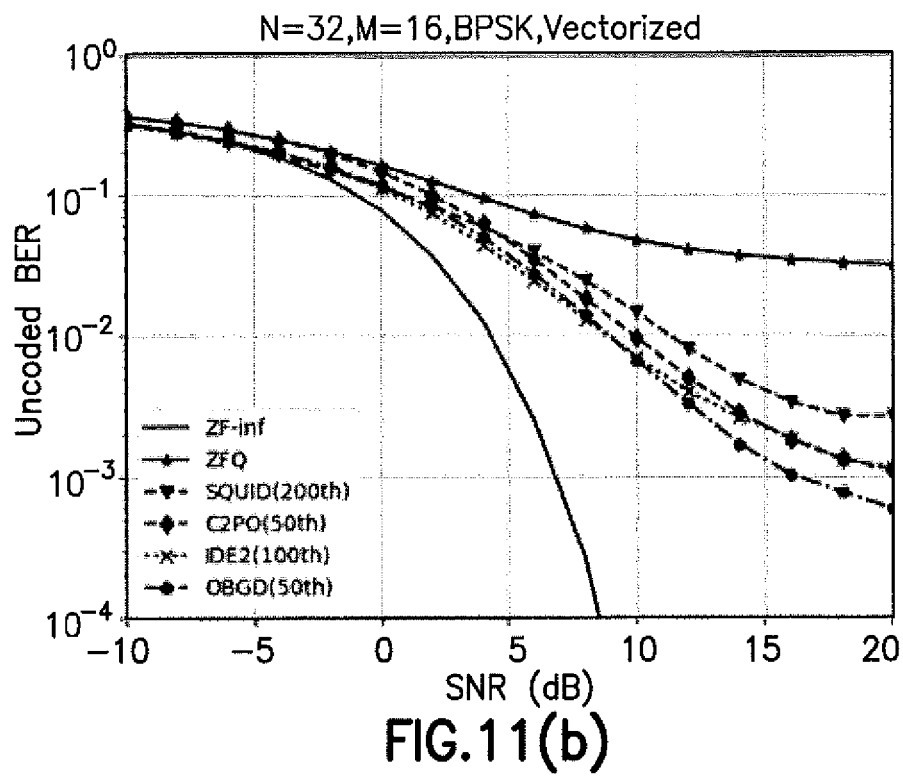
Figure 11C:
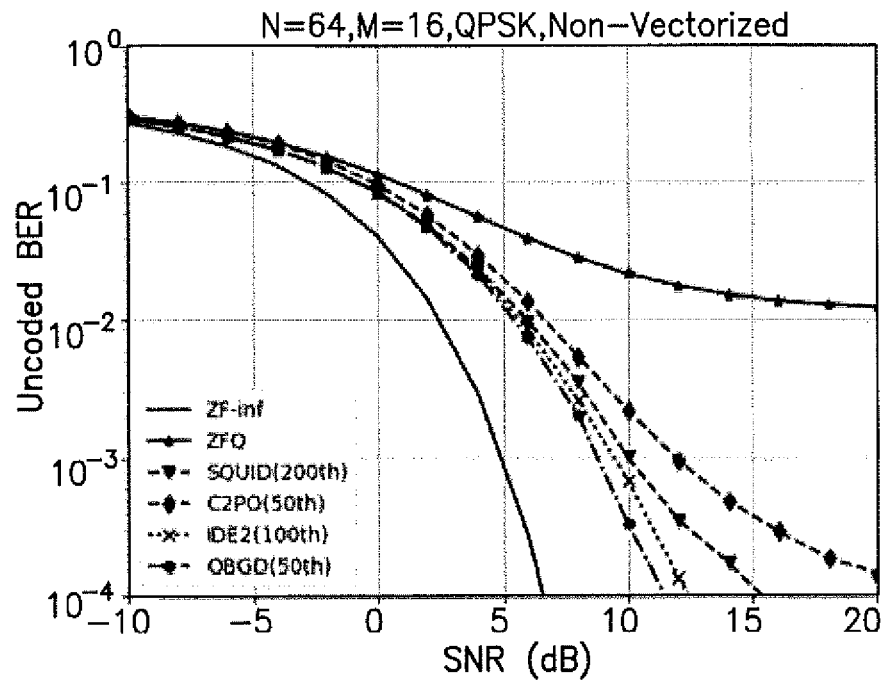
Figure 11D:
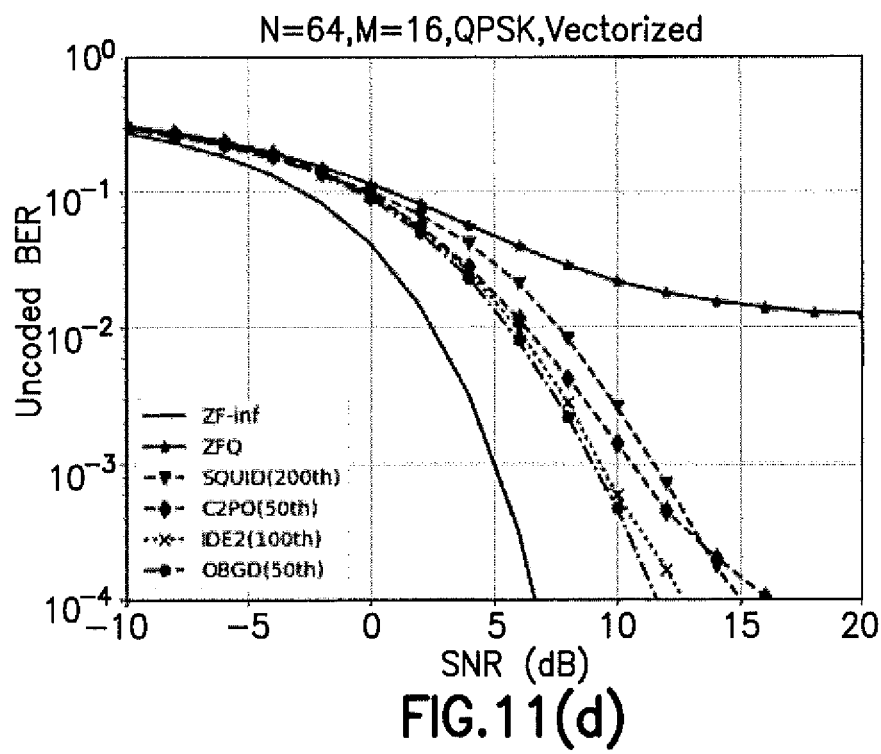
Figure 11E:
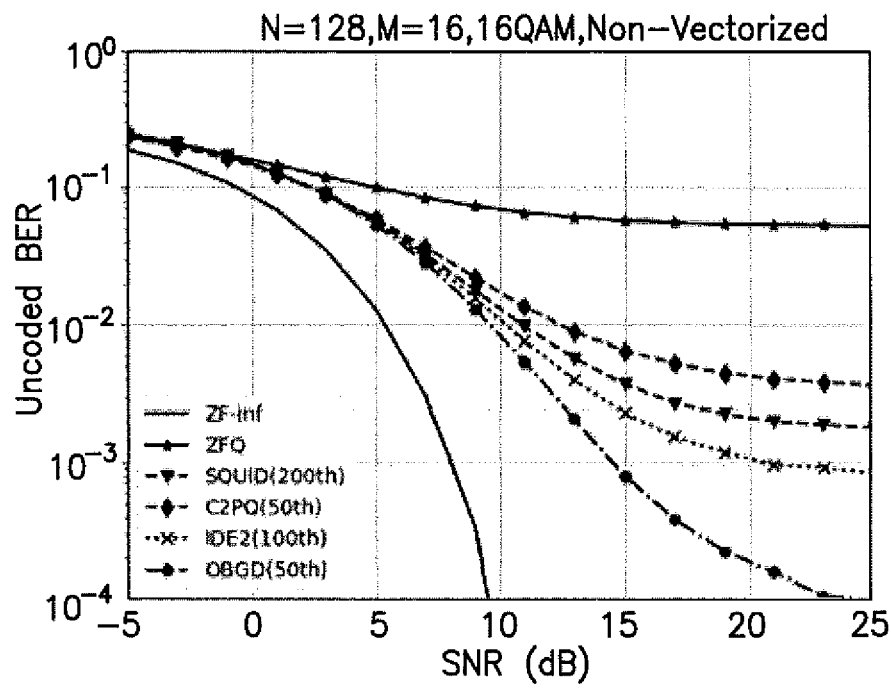
Figure 11F:
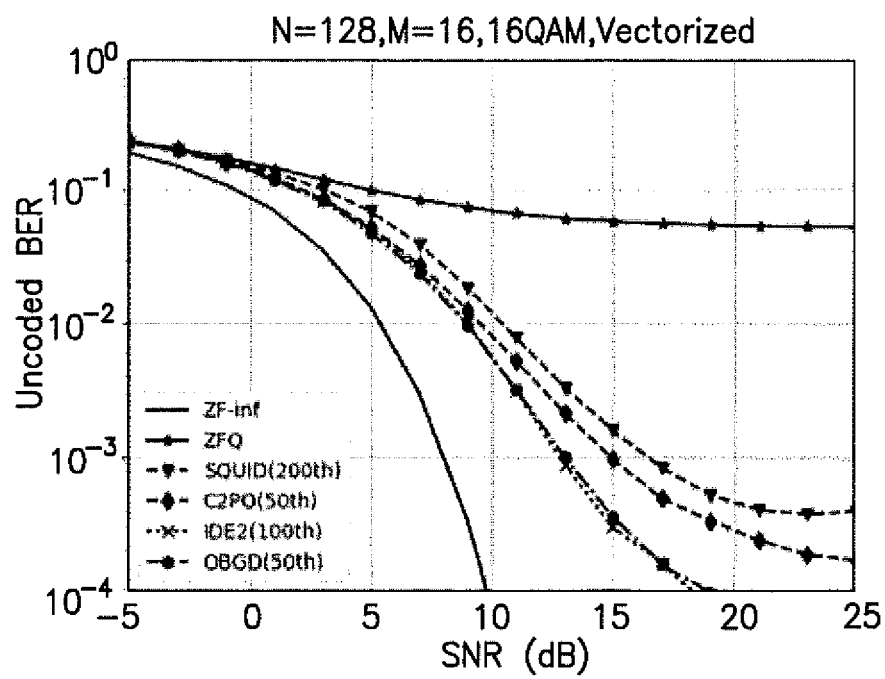

In FIG. 10 (a), a system load factor (defined as N/M) is 2, and the BPSK modulation is adopted. Among all the quantized precoders, the OBGD precoder achieves the best BER performance, especially when the SNR is larger than 10 dB. In FIG. 10 (b), the system load factor NIM=4, and the QPSK modulation is adopted. In this simulation, the OBGD precoder also achieves the best BER performance. In FIG. 10 (c), the system load factor NIM=8, and the 16QAM modulation (a high-order modulation) is adopted. In this simulation, both the OBGD and IDE2 precoders achieve the best BER performances.

In scenario 2, both non-vectorized and vectorized data are used to evaluate the BER performances for different precoders. Generally, vectorization would increase the computational complexity greatly because vectorized data often has high dimensions. In FIGS. 11 (a) and (b), the system load factor NIM=2, and the BPSK modulation is adopted. In this simulation, the OBGD precoder achieves the best BER performance, and the OBGD precoders with and without vectorization achieve similar BER performances. For the SQUID precoder, the performance gap between vectorized and non-vectorized versions is relatively larger than other preoders.

In FIGS. 11 (c) and (d), the system load factor N/M=4, and the QPSK modulation is adopted. In this simulation, the OBGD precoders with and without vectorization achieve the best BER performances, while the IDE2 precoders with and without vectorization achieve slightly worse BER performances.

In FIGS. 11 (e) and (f), the system load factor N/M=8, and the 16QAM modulation is adopted. In this simulation, the OBGD precoder still achieves the best BER performances, especially for the non-vectorized data. The IDE2 precoder achieves a worse BER performance for the non-vectorized data but achieves a similar BER performance with the OBGD precoder for vectorized data. Similarly, the SQUID and C2PO precoders with vectorization achieve better performances than the SQUID and C2PO precoders without vectorization. It is obvious that the IDE2, SQUID and C2PO precoders have large dependences on vectorization for the high-order modulation.

Vectorization for a specific signal block can facilitate to keeping the signals in this block having the same precoding factor, thus the receivers, implemented by UEs, can use the normalized factor of the pilot signal to calculate the data signals. But for the BPSK and QPSK modulations, such calculation is not necessary at the UE side. Therefore, for low-order modulations, such as BPSK and QPSK, the dependences on the vectorization are insignificant for all the precoders. While for high-order modulations like 16QAM, the normalized factor is essential for UEs to calculate the data signal. Hence, the dependences on the vectorization for most non-linear precoders are quite large, except for the OBGD precoder, which has few dependences on vectorization.

In the two-bit quantization case, the performances of the ZFQ, IDE2 and OBGD precoders are compared for different scenarios and different antenna numbers. The SQUID and C2PO precoders are not tested here because they are specified for 1-bit quantization case.

Figure 12A:
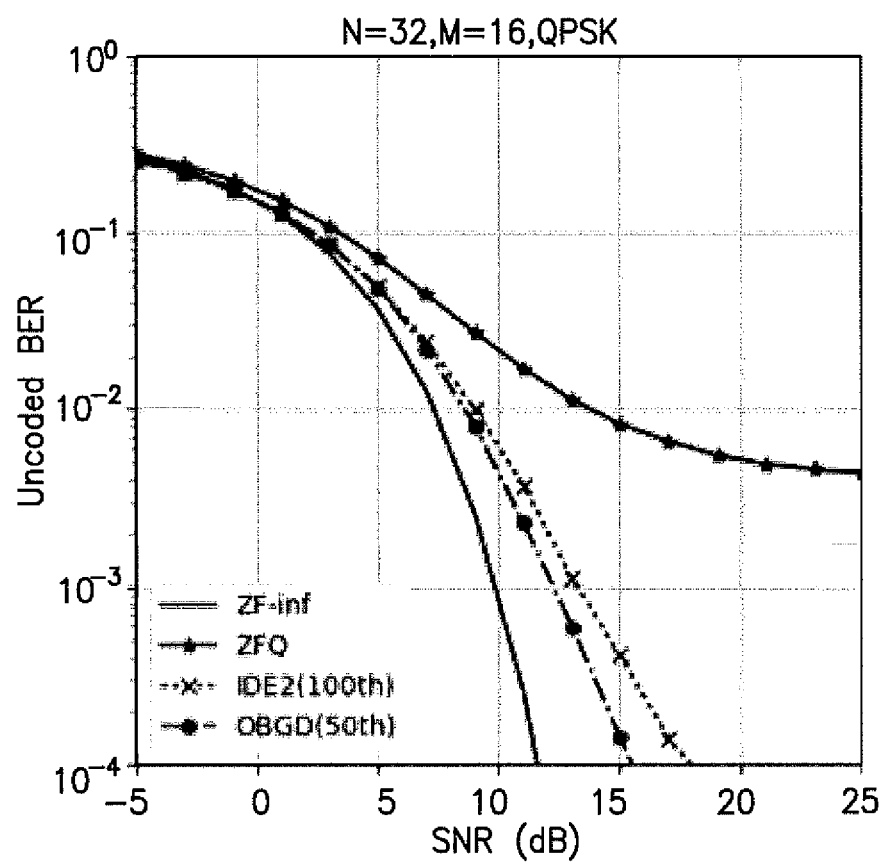
FIGS. 12 (a)-12 (c) illustrate example BER performances for different precoders in Scenario 1 under a 2-bit case.
Figure 12B:
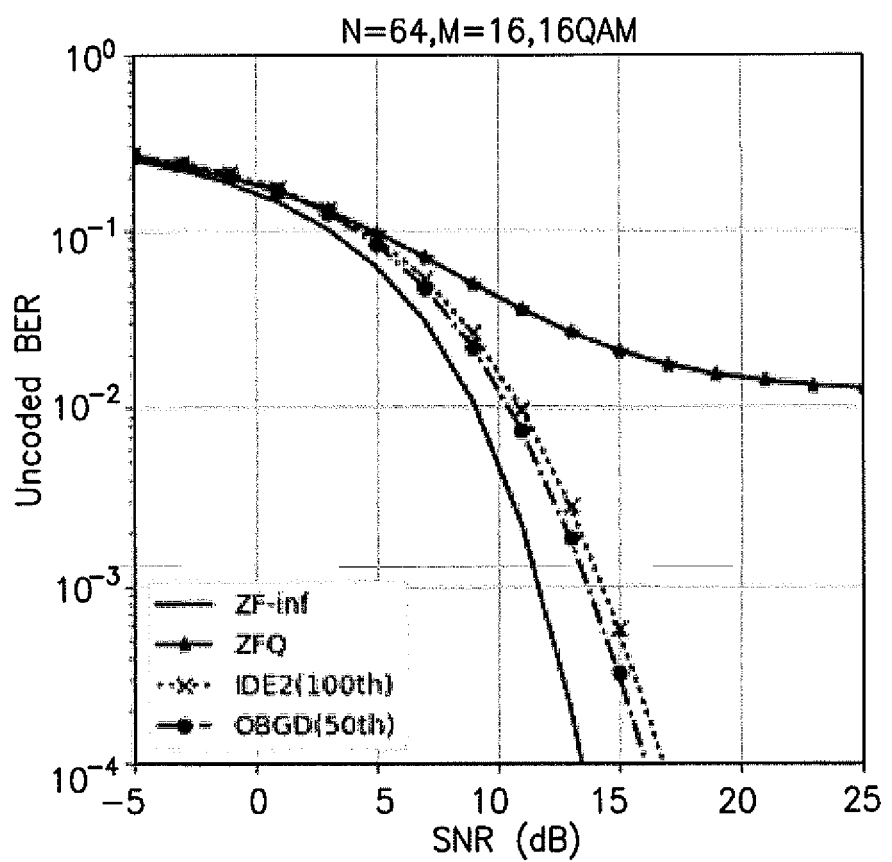
Figure 12C:
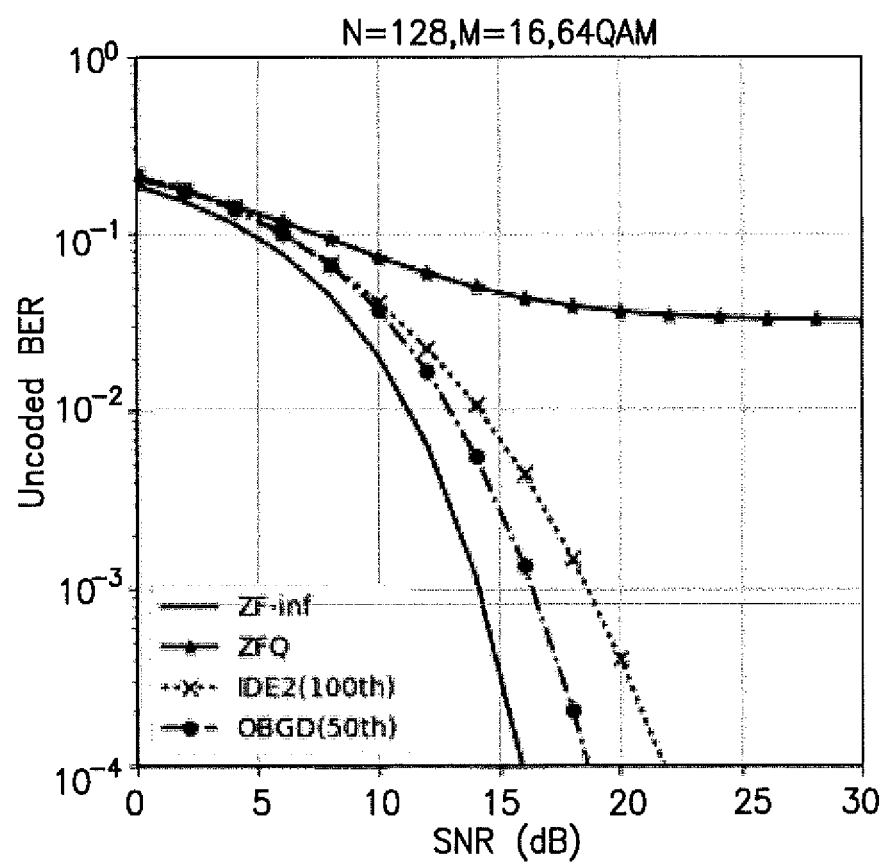
Figure 13A:
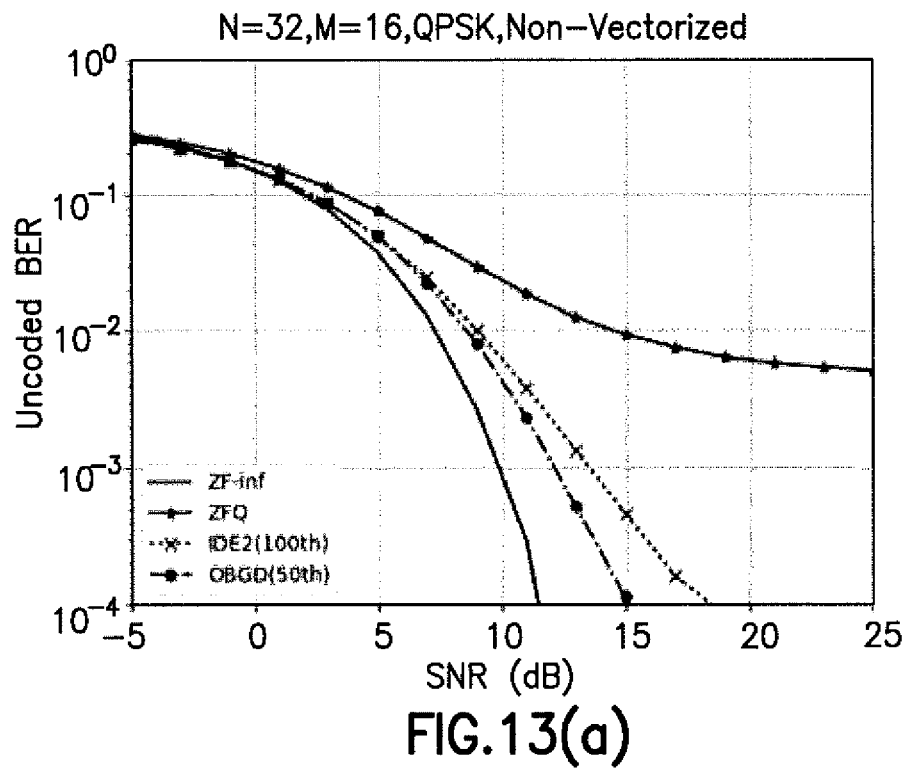
FIGS. 13 (a)-13 (f) illustrate example BER performances for different precoders in Scenario 2 under a 2-bit case.
Figure 13B:
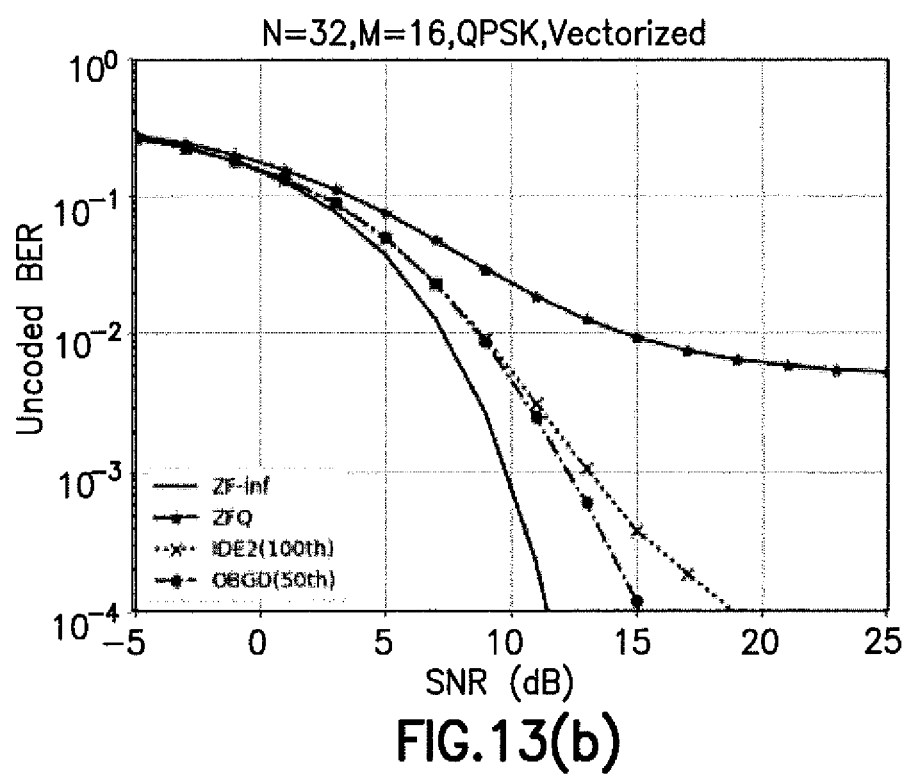
Figure 13C:
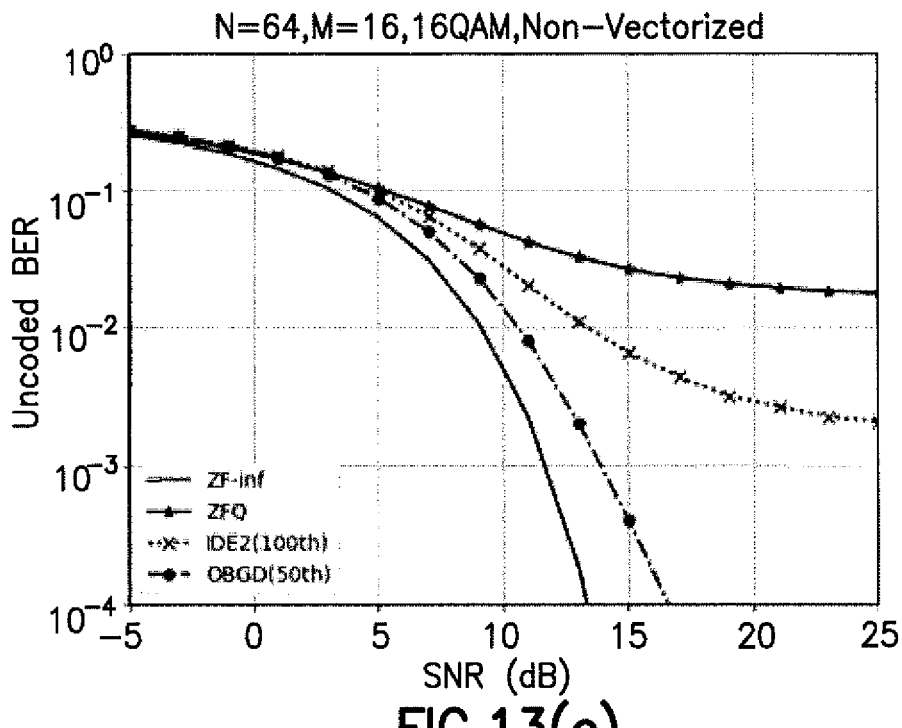
Figure 13D:
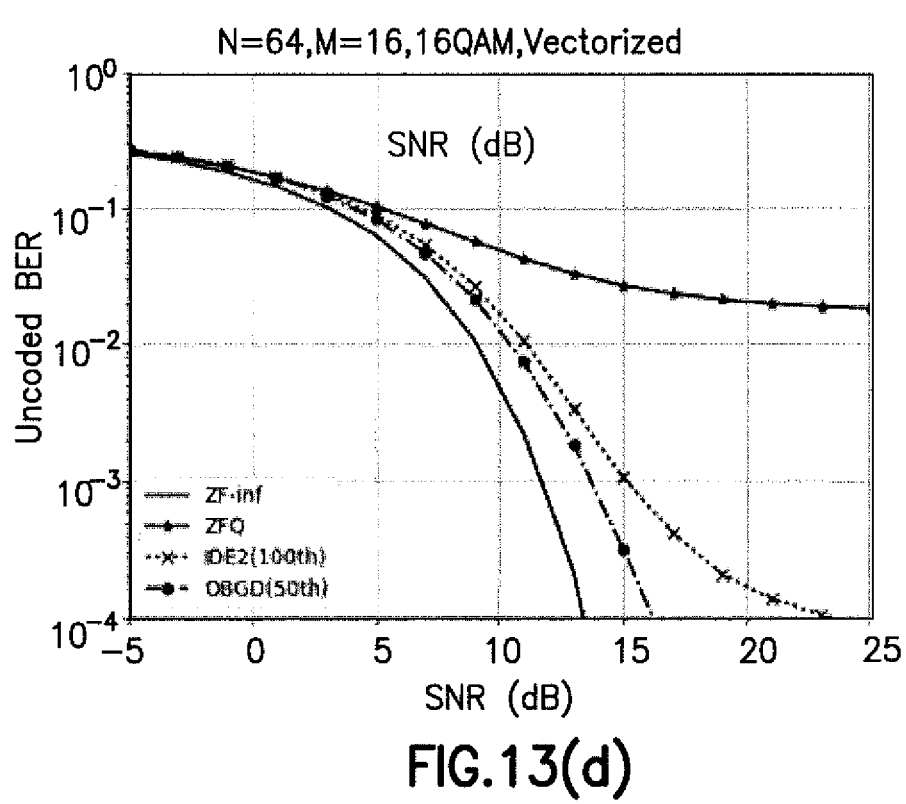
Figure 13E:
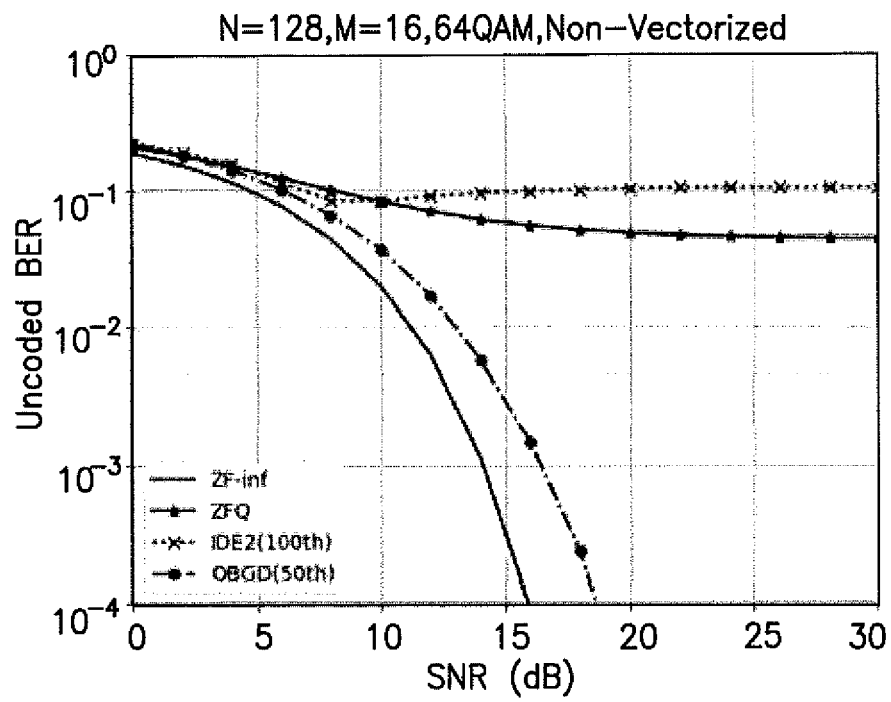
Figure 13F:
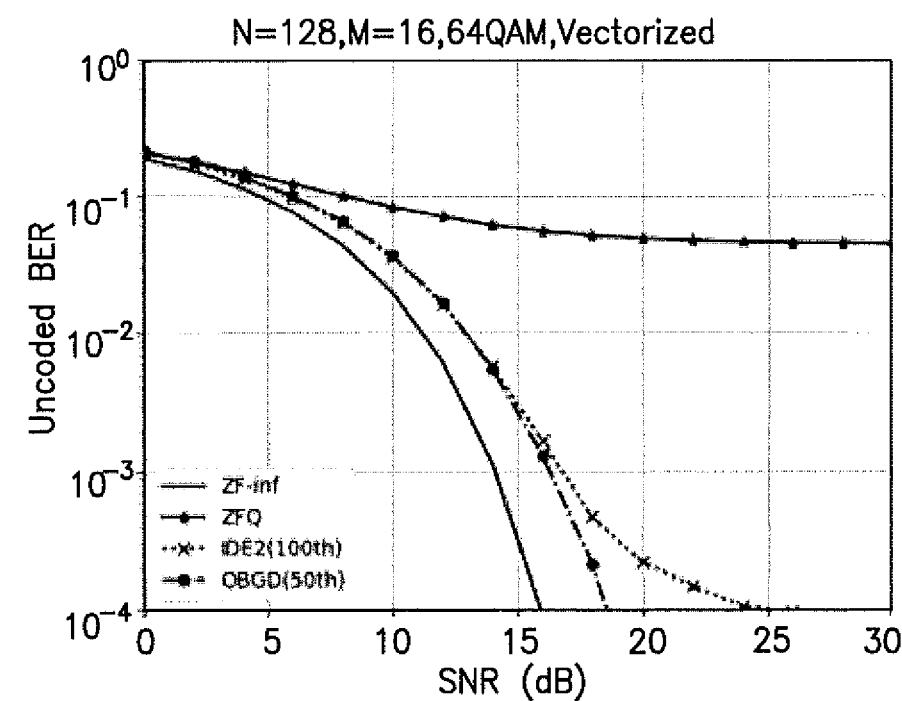

In scenario 1, the ideal scenario, the BER performances for three configurations are evaluated. In FIG. 12 (a), the system load factor N/M=2, and the QPSK modulation is adopted. In this simulation, the OBGD precoder achieves the best BER performance (nearest to the ZF-inf), the IDE2 and ZFQ precoders achieve the second best and the worst performance, respectively. In FIGS. 12 (b) and (c), the results are similar, the OBGD precoder achieves the best BER performance, the IDE2 precoder achieves the second best BER performance, and the ZFQ precoders achieves the worst BER performance.

In scenario 2, the practical scenario, the BER performances for the same three configurations are evaluated. For the first configuration in FIGS. 13 (a) and (b) where the QPSK modulation is adopted, the precoding factor is not necessary for the receivers to calculate the data signals. Therefore, the performances between vectorized and non-vectorized are similar. The OBGD precoderachieves a better BER performance than the IDE2 and ZFQ precoders for both vectorized and non-vectorized data.

In FIGS. 13 (c) and (d), the system load factor N/M=4, and the 16QAM modulation is adopted. In this simulation, the IDE2 precoder has a large dependence on the vectorization, the gap between the BER performances with and without vectorization is quite large. While for the OBGD precoder, the performance gap between the non-vectorized and the vectorized are quite small, which means that the OBGD precoder has few dependences on the vectorization.

In FIGS. 13 (e) and (f), the system load factor N/M=8, and the 64QAM modulation is adopted. In this simulation, the IDE2 precoder achieves the worst BER performance without vectorization, even worse than the linear-quantized ZFQ precoder. While the IDE2 precoder with vectorization achieves a much better BER performance, only a bit worse than the OBGD precoder. In contrast, the OBGD precoder with vectorization and the OBGD precoder without vectorization achieve similar BER performances, the best among all quantized precoders. Therefore, the OBGD precoder has few dependences on vectorization.

In the three-bit quantization case, the performances of the ZFQ, IDE2 and OBGD precoders are compared for different scenarios and different antenna numbers. For 3-bit quantization, the distortion caused by quantization is much smaller than 1-bit and 2-bit cases. Hence, 16QAM, 64QAM and 256QAM modulations are adopted in 3-bit quantization case.

Figure 14A:
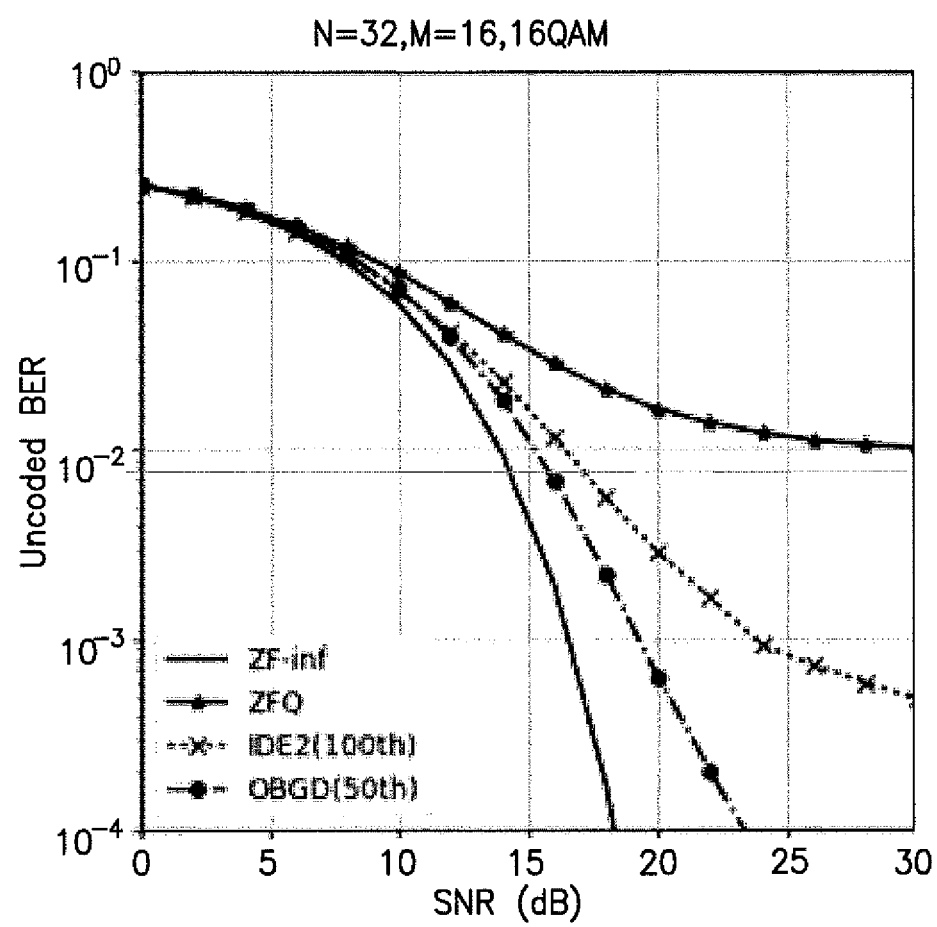
FIGS. 14 (a)-14 (c) illustrate example BER performances for different precoders in Scenario 1 under a 3-bit case.
Figure 14B:
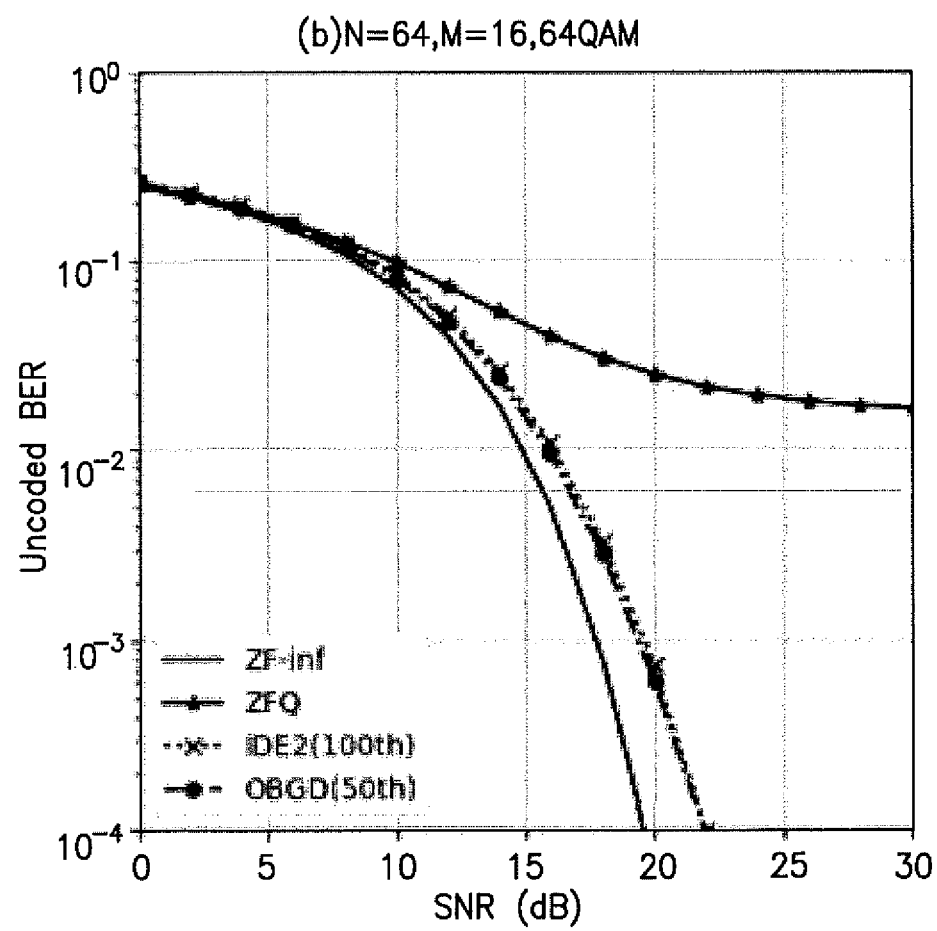
Figure 14C:
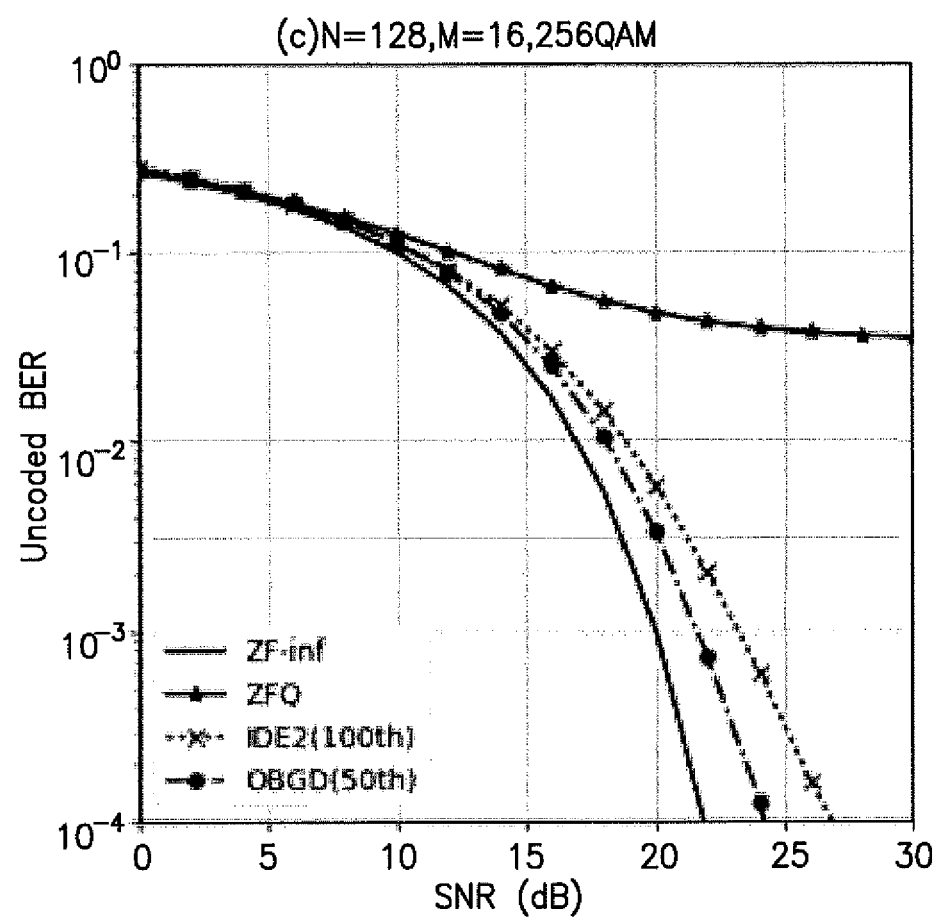
Figure 15A:
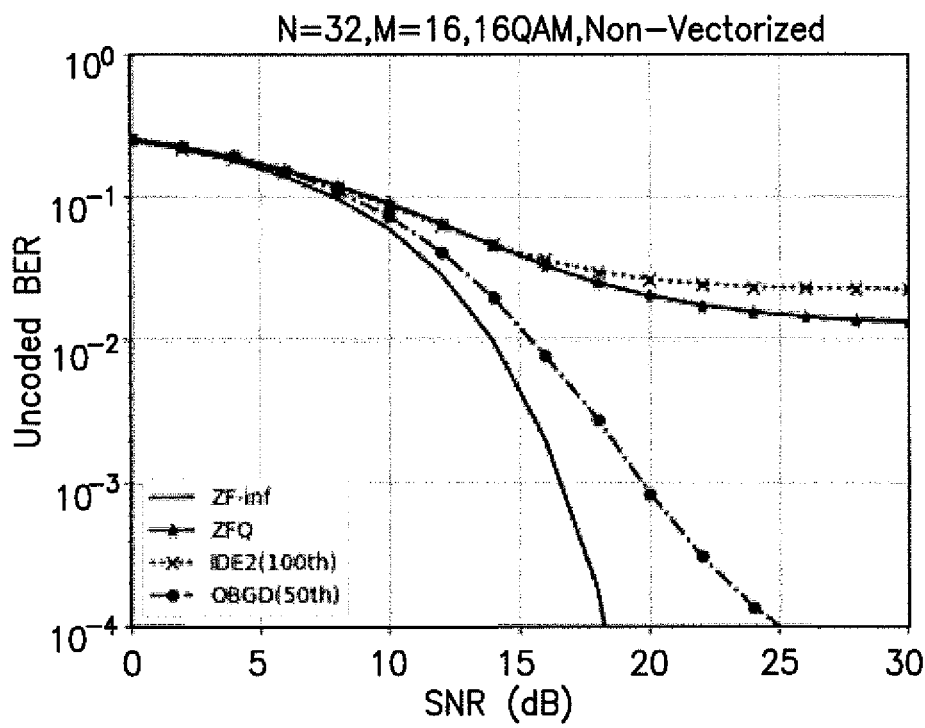
FIGS. 15 (a)-15 (f) illustrate example BER performances for different precoders in Scenario 2 under a 3-bit case.
Figure 15B:
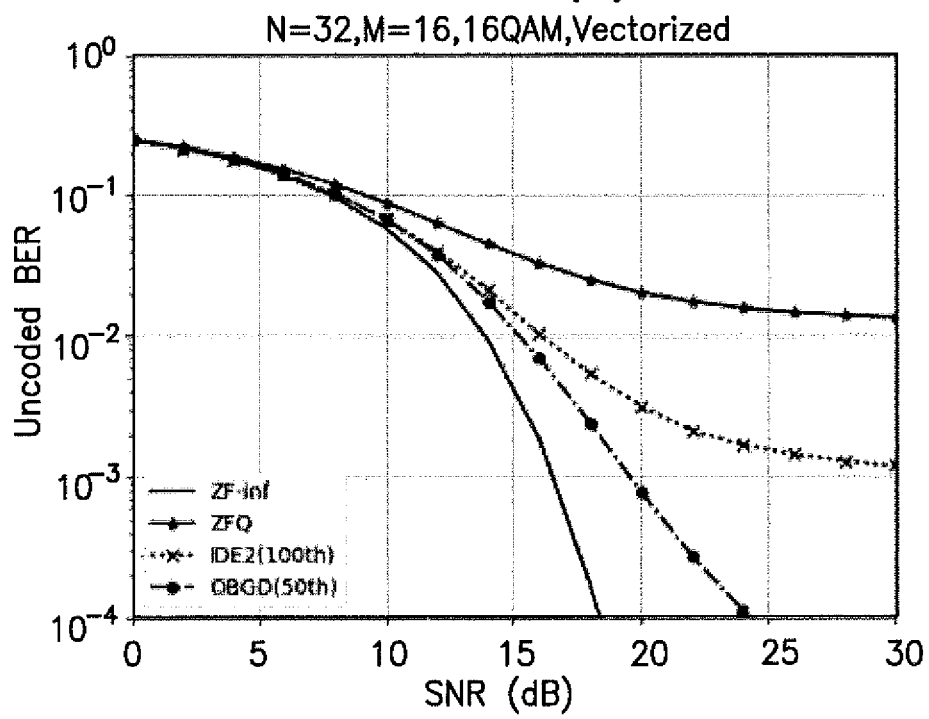
Figure 15C:
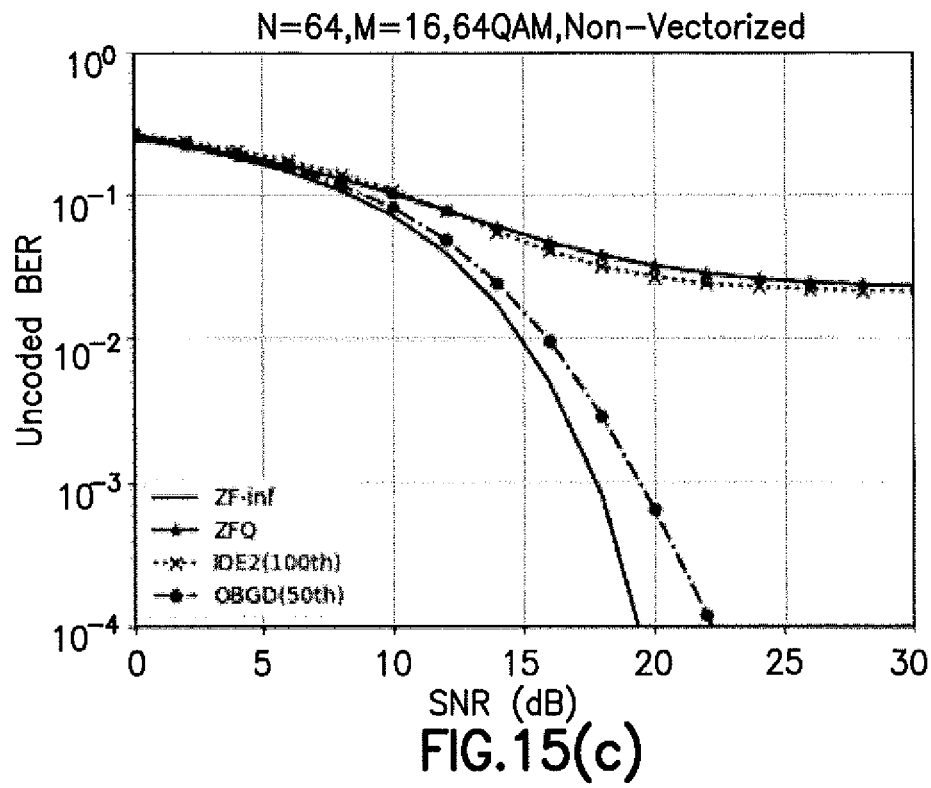
Figure 15D:
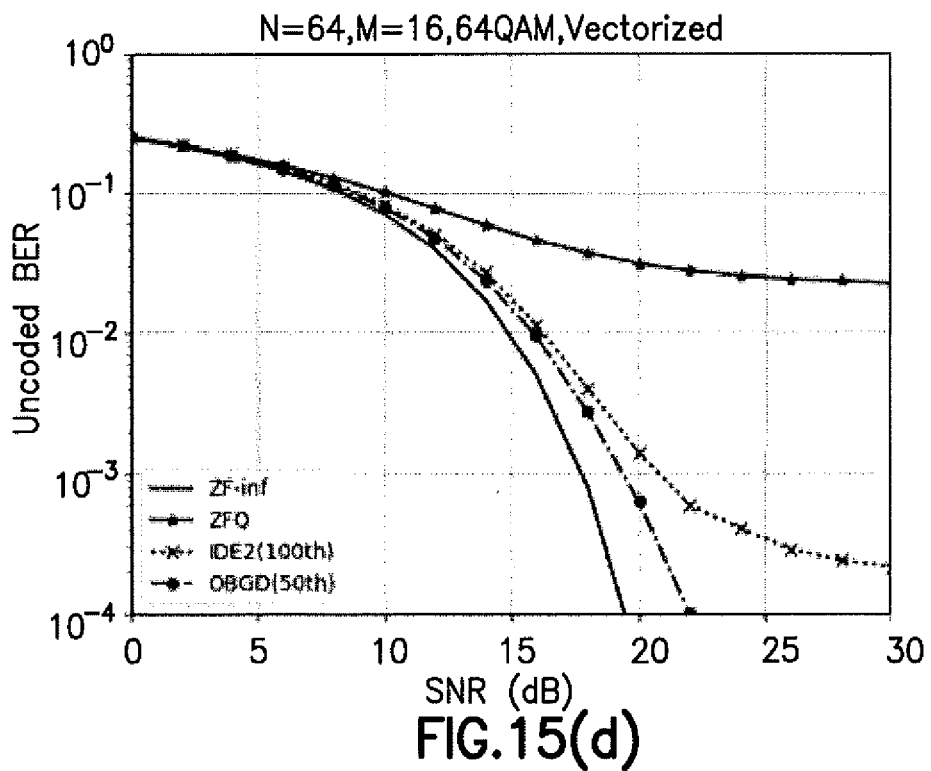
Figure 15E:
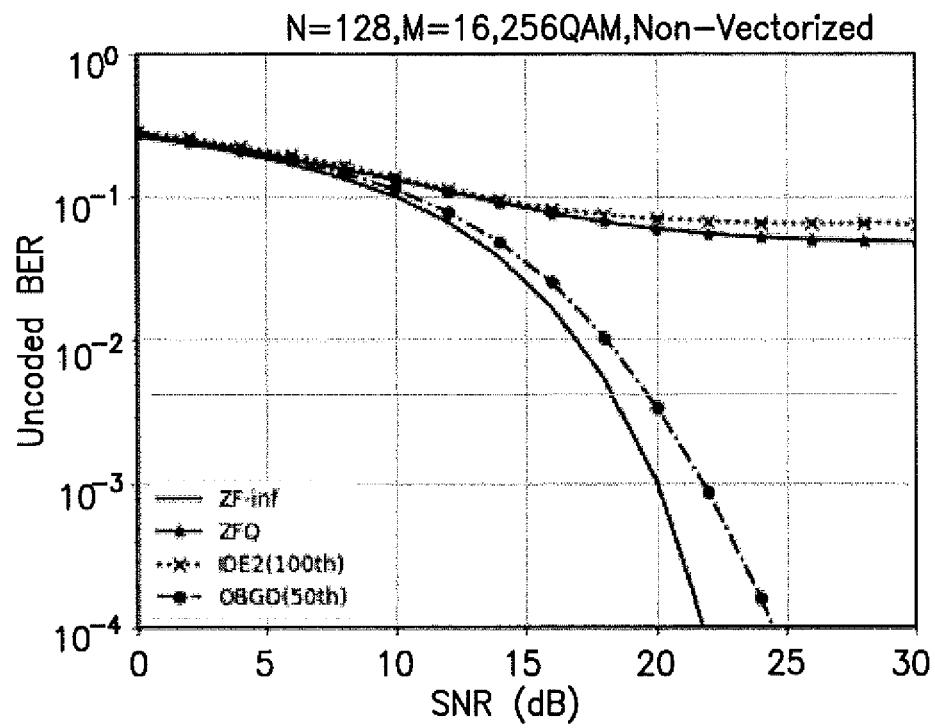
Figure 15F:
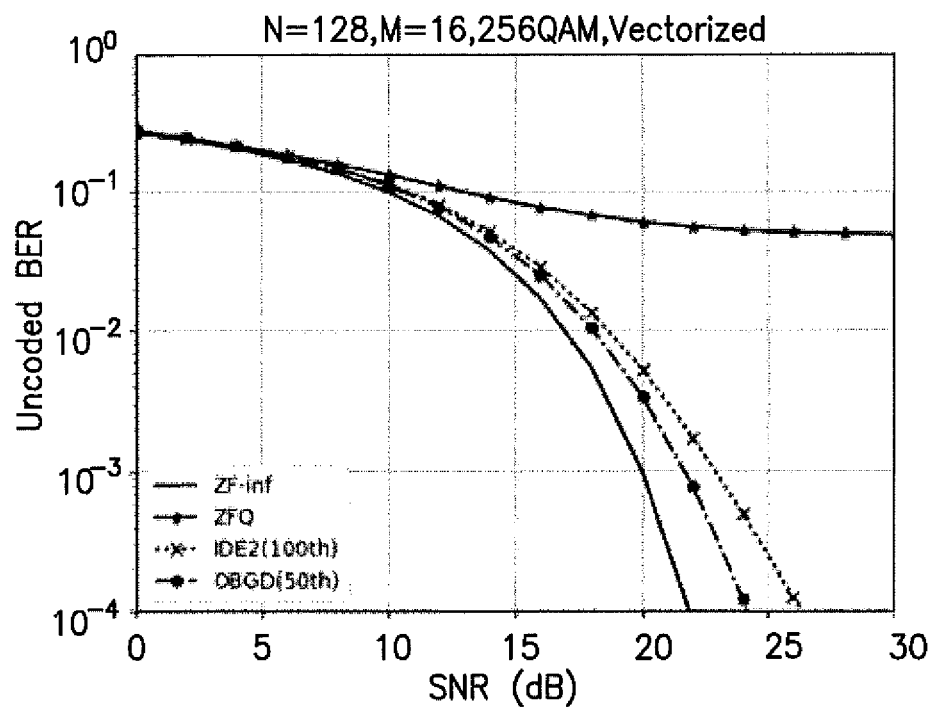

In scenario 1, the ideal scenario, BER performances for three configurations are evaluated. In FIG. 14 (a), the system load factor is 2, and the 16QAM modulation is adopted. The OBGD precoder achieves the best BER performance among all the quantized precoders, much better than the IDE2 and ZFQ precoders. In FIG. 14 (b), the system load factor is 4, and the 64QAM modulation is adopted. The OBGD and IDE2 precoders achieve similar BER performances, much better than the ZFQ precoder. In FIG. 14 (c), the system load factor is 8, and the 256QAM modulation is adopted. The OBGD precoder achieves the best BER performance, and the IDE2 precoder achieves a slightly worse performance.

In scenario 2, the practical scenario, the BER performances for the same three configurations in scenario 1 are evaluated. In FIGS. 15 (a) and (b), the system load factor is 2, and the 16QAM modulation is adopted. The OBGD precoder without vectorization and the OBGD precoder with vectorization achieve similar BER performances, which both are the best among all the quantized precoders. In contrast, the IDE2 precoder with vectorization achieves the second best BER performance while the IDE2 precoder without vectorization achieves the worst BER performance. Hence, the IDE2 precoder has a large dependence on the vectorization.

In FIGS. 15 (c) and (d), the system load factor is 4, and the 64QAM modulation is adopted. The OBGD precoder still achieves the best BER performance, and vectorization has few effects on the OBGD precoder. While for the IDE2 precoder, vectorization is a must for a satisfactory BER performance. Without vectorization, the IDE2 precoder can only achieve a similar performance with the ZFQ precoder, which is much worse than the OBGD precoder. While with vectorization, the IDE2 precoder can achieve a much better performance than the ZFQ precoder, which is a bit worse than the OBGD precoder.

In FIGS. 15 (e) and (f), the system load factor is 8, and the 256QAM modulation is adopted. In this simulation, the OBGD precoder still achieves the best BER performance no matter vectorization is applied or not. While for the IDE2 precoder, vectorization has great effects on the BER performance. With vectorization, the IDE2 precoder can achieve a satisfactory performance much better than the ZFQ precoder but slightly worse than the OBGD precoder. Without vectorization, the IDE2 precoder achieves the worst BER performance, slightly worse than the ZFQ precoder.

Obviously, for high-order modulations like 16QAM, 64QAM and 256QAM, IDE2 must vectorize the signal block to search the near-optimal solution in a much higher dimension space. Thus, the computation complexity would increase a lot (by $T^2$) because of the high dimension matrices and vectors. Therefore, the conventional non-linear quantized precoders are not practical. The proposed OBGD based quantized precoder has few dependences on the vectorization, it can achieve superior performance without vectorization. Hence, the OBGD based quantized precoding scheme is much more practical than the conventional quantized precoders for massive MIMO systems with low-resolution DACs. Compared to the conventional non-linear quantized precoders, the quantized precoding algorithm proposed in the present disclosure has a lower complexity and has a better detection performance.

Figure 16:
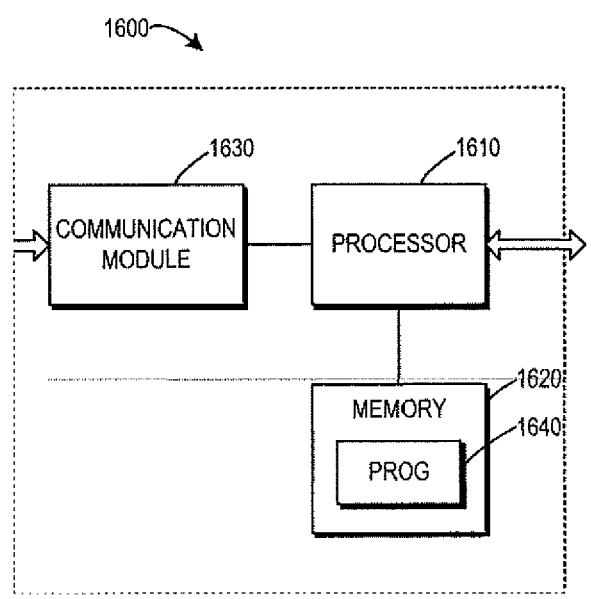
FIG. 16 illustrates a simplified block diagram of a device that is suitable for implementing example embodiments of the present disclosure.

FIG. 16 is a simplified block diagram of a device 1600 that is suitable for implementing example embodiments of the present disclosure. The device 1600 can be implemented at or as a part of the transmitter 410 as shown in FIG. 4.

As shown, the device 1600 includes a processor 1610, a memory 1620 coupled to the processor 1610, a communication module 1630 coupled to the processor 1610, and a communication interface (not shown) coupled to the communication module 1630. The memory 1620 stores at least a program 1640. The communication module 1630 is for bidirectional communications via a plurality of antennas. The communication interface may represent any interface that is necessary for communication.

The program 1640 is assumed to include program instructions that, when executed by the associated processor 1610, enable the device 1600 to operate in accordance with the example embodiments of the present disclosure, as discussed herein with reference to FIGS. 4-9. The example embodiments herein may be implemented by computer software executable by the processor 1610 of the device 1600, or by hardware, or by a combination of software and hardware. The processor 1610 may be configured to implement various example embodiments of the present disclosure.

The memory 1620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1620 is shown in the device 1600, there may be several physically distinct memory modules in the device 1600. The processor 1610 may be of any type suitable to the local technical network, and may include one or more of general purpose computers, special purpose computers, microprocessors, digital signal processors (DSPs) and processors based on multicore processor architecture, as non-limiting examples. The device 1600 may have multiple processors, such as an application specific integrated circuit chip that is slaved in time to a clock which synchronizes the main processor.

When the device 1600 acts as the transmitter 410, the processor 1610 and the communication module 1630 may cooperate to implement the method 500 and the processes 600 and 900 as described above with reference to FIGS. 4-9. All operations and features as described above with reference to FIGS. 4-9 are likewise applicable to the device 1600 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 500 and the processes 600 and 900 as described above with reference to FIGS. 4-9. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspects, a transmitter comprises: at least one processor; and at least one memory including computer program code; the at least one memory and the computer program code configured to, with the at least one processor, cause the first device to: determine a normalized factor for precoding of a plurality of signals intended for a plurality of receivers; precode the plurality of intended signals using the normalized factor by iteratively performing acts comprising: determining, by using the normalized factor, a descending direction of a difference between the plurality of intended signals and corresponding signals received at the plurality of receivers, a descending rate of the difference being above a threshold rate in the descending direction, and determining a plurality of precoded signals based on the descending direction; and quantize the plurality of precoded signals for transmission by the transmitter to the plurality of receivers.

In some example embodiments, the transmitter is caused to determine the normalized factor by: determining, based on a transmitting power of the transmitter and a quantization constant, a normalized factor for precoding of the plurality of original signals.

In some example embodiments, the normalized factor is determined as:

$$\beta = \frac{1}{\tau}\sqrt{\frac{ME_s}{P(N-M)}},$$

where $\beta$ is the normalized factor, $E_s$ is an average energy of the plurality of original signals, P is a transmitting power, N is the number of the transmitting antennas, M is the number of the intended signals, and i is the quantization constant.

In some example embodiments, the determination of the normalized factor is further based on a signal-to-noise ratio.

In some example embodiments, the transmitter is caused to determine the plurality of precoded signals based on the descending direction by: determining an accumulated descending direction based on the descending direction using a predetermined accumulating rate; and updating the plurality of precoded signals based on the accumulated descending direction and an update step size.

In some example embodiments, the update step size is determined at least in part based on the plurality of intended signals and channel state information about a wireless channel between the transmitter and the plurality of receivers.

In some example embodiments, the update step size is determined further based on a signal-to-noise ratio.

In some example embodiments, the transmitter is caused to update the plurality of precoded signals based on the accumulated descending direction and the update step size by: updating the plurality of precoded signals, based on the accumulated descending direction and the update step size, by a monotonically increasing, odd symmetric and saturating function for real and imaginary parts of the plurality of precoded signals, separately.

In some example embodiments, the function comprises a clipping function.

In some example embodiments, the acts further comprise: after the determination of the descending direction and the determination of the plurality of precoded signals are performed iteratively for a predetermined times, updating the normalized factor based on the plurality of precoded signals.

In some example embodiments, the acts further comprise: regularizing the plurality of precoded signals.

In some aspects, a method implemented at a transmitter comprises: determining a normalized factor for precoding of a plurality of signals intended for a plurality of receivers; precoding the plurality of intended signals using the normalized factor by iteratively performing acts comprising: determining, by using the normalized factor, a descending direction of a difference between the plurality of intended signals and corresponding signals received at the plurality of receivers, a descending rate of the difference being above a threshold rate in the descending direction, and determining a plurality of precoded signals based on the descending direction; and quantizing the plurality of precoded signals for transmission by the transmitter to the plurality of receivers.

In some example embodiments, determining the normalized factor comprises: determining, based on a transmitting power of the transmitter and a quantization constant, a normalized factor for precoding of the plurality of original signals.

In some example embodiments, the normalized factor is determined as:

$$\beta = \frac{1}{\tau}\sqrt{\frac{ME_s}{P(N-M)}},$$

where $\beta$ is the normalized factor, $E_s$ is an average energy of the plurality of original signals, P is a transmitting power, N is the number of the transmitting antennas, M is the number of the intended signals, and $\tau$ is the quantization constant.

In some example embodiments, the determination of the normalized factor is further based on a signal-to-noise ratio.

In some example embodiments, determining the plurality of precoded signals based on the descending direction comprises: determining an accumulated descending direction based on the descending direction using a predetermined accumulating rate; and updating the plurality of precoded signals based on the accumulated descending direction and an update step size.

In some example embodiments, the update step size is determined at least in part based on the plurality of intended signals and channel state information about a wireless channel between the transmitter and the plurality of receivers.

In some example embodiments, the update step size is determined further based on a signal-to-noise ratio.

In some example embodiments, updating the plurality of precoded signals based on the accumulated descending direction and the update step size comprises: updating the plurality of precoded signals, based on the accumulated descending direction and the update step size, by a monotonically increasing, odd symmetric and saturating function for real and imaginary parts of the plurality of precoded signals, separately.

In some example embodiments, the function comprises a clipping function.

In some example embodiments, the acts further comprise: after the determination of the descending direction and the determination of the plurality of precoded signals are performed iteratively for a predetermined times, updating the normalized factor based on the plurality of precoded signals.

In some example embodiments, the acts further comprise: regularizing the plurality of precoded signals.

In some aspects, an apparatus comprises: means for determining a normalized factor for precoding of a plurality of signals intended for a plurality of receivers; means for precoding the plurality of intended signals using the normalized factor by iteratively performing acts comprising: determining, by using the normalized factor, a descending direction of a difference between the plurality of intended signals and corresponding signals received at the plurality of receivers, a descending rate of the difference being above a threshold rate in the descending direction, and determining a plurality of precoded signals based on the descending direction; and quantizing the plurality of precoded signals for transmission by the transmitter to the plurality of receivers.

In some example embodiments, the means for determining the normalized factor comprises: means for determining, based on a transmitting power and a quantization constant, a normalized factor for precoding of the plurality of original signals.

In some example embodiments, the normalized factor is determined as:

$$\beta = \frac{1}{\tau}\sqrt{\frac{ME_s}{P(N-M)}},$$

where $\beta$ is the normalized factor, $E_s$ is an average energy of the plurality of original signals, P is a transmitting power, N is the number of the transmitting antennas, M is the number of the intended signals, and i is the quantization constant.

In some example embodiments, the determination of the normalized factor is further based on a signal-to-noise ratio.

In some example embodiments, the means for determining the plurality of precoded signals based on the descending direction comprises: means for determining an accumulated descending direction based on the descending direction using a predetermined accumulating rate; and means for updating the plurality of precoded signals based on the accumulated descending direction and an update step size.

In some example embodiments, the update step size is determined at least in part based on the plurality of intended signals and channel state information about a wireless channel between the transmitter and the plurality of receivers.

In some example embodiments, the update step size is determined further based on a signal-to-noise ratio.

In some example embodiments, the means for updating the plurality of precoded signals based on the accumulated descending direction and the update step size comprises: means for updating the plurality of precoded signals, based on the accumulated descending direction and the update step size, by a monotonically increasing, odd symmetric and saturating function for real and imaginary parts of the plurality of precoded signals, separately.

In some example embodiments, the function comprises a clipping function.

In some example embodiments, the acts further comprise: after the determination of the descending direction and the determination of the plurality of precoded signals are performed iteratively for a predetermined times, updating the normalized factor based on the plurality of precoded signals.

In some example embodiments, the acts further comprise: regularizing the plurality of precoded signals.

In some aspects, a computer readable storage medium comprises program instructions stored thereon, the instructions, when executed by a processor of a device, causing the device to perform the method according to some example embodiments of the present disclosure.

What is claimed is:

1. A transmitter, comprising:
   at least one processor; and
   at least one non-transitory memory including computer program code;
   the at least one memory and the computer program code configured to, with the at least one processor, cause the transmitter to:
      determine a normalized factor for precoding of a plurality of signals intended for a plurality of receivers;
      precode the plurality of intended signals using the normalized factor with iteratively performing acts comprising:
         determining, with using the normalized factor, a descending direction of a difference between the plurality of intended signals and corresponding signals received at the plurality of receivers, a descending rate of the difference being above a threshold rate in the descending direction, and determining a plurality of precoded signals based on the descending direction; and
      quantize the plurality of precoded signals for transmission with the transmitter to the plurality of receivers.

2. The transmitter of claim 1, wherein the transmitter is caused to determine the normalized factor with:
   determining, based on a transmitting power of the transmitter and a quantization constant, a normalized factor for precoding of the plurality of original signals.

3. The transmitter of claim 2, wherein the normalized factor is determined as:

$$\beta = \frac{1}{\tau}\sqrt{\frac{ME_s}{P(N-M)}},$$

where $\beta$ is the normalized factor, $E_s$ is an average energy of the plurality of original signals, P is a transmitting power, N is the number of the transmitting antennas, M is the number of the intended signals, and $\tau$ is the quantization constant.

4. The transmitter of claim 2, wherein the determination of the normalized factor is further based on a signal-to-noise ratio.

5. The transmitter of claim 1, wherein the transmitter is caused to determine the plurality of precoded signals based on the descending direction with:
   determining an accumulated descending direction based on the descending direction using a predetermined accumulating rate; and updating the plurality of precoded signals based on the accumulated descending direction and an update step size.

6. The transmitter of claim 5, wherein the update step size is determined at least in part based on the plurality of intended signals and channel state information about a wireless channel between the transmitter and the plurality of receivers.

7. The transmitter of claim 5, wherein the transmitter is caused to update the plurality of precoded signals based on the accumulated descending direction and the update step size with:
updating the plurality of precoded signals, based on the accumulated descending direction and the update step size, with a monotonically increasing, odd symmetric and saturating function for real and imaginary parts of the plurality of precoded signals, separately.

8. The transmitter of claim 1, wherein the acts further comprise:
after the determination of the descending direction and the determination of the plurality of precoded signals are performed iteratively for a predetermined times, updating the normalized factor based on the plurality of precoded signals.

9. The transmitter of claim 1, wherein the acts further comprise: regularizing the plurality of precoded signals.

10. A method implemented at a transmitter, comprising:
determining a normalized factor for precoding of a plurality of signals intended for a plurality of receivers;
precoding the plurality of intended signals using the normalized factor with iteratively performing acts comprising:
determining, with using the normalized factor, a descending direction of a difference between the plurality of intended signals and corresponding signals received at the plurality of receivers, a descending rate of the difference being above a threshold rate in the descending direction, and determining a plurality of precoded signals based on the descending direction; and
quantizing the plurality of precoded signals for transmission with the transmitter to the plurality of receivers.

11. The method of claim 10, wherein determining the normalized factor comprises:
determining, based on a transmitting power of the transmitter and a quantization constant, a normalized factor for precoding of the plurality of original signals.

12. The method of claim 11, wherein the normalized factor is determined as:

$$\beta = \frac{1}{\tau}\sqrt{\frac{ME_s}{P(N-M)}},$$

where $\beta$ is the normalized factor, is an average energy of the plurality of original signals, P is a transmitting power, N is the $E_s$ number of the transmitting antennas, M is the number of the intended signals, and $\tau$ is the quantization constant.

13. The method of claim 11, wherein the determination of the normalized factor is further based on a signal-to-noise ratio.

14. The method of claim 10, wherein determining the plurality of precoded signals based on the descending direction comprises:
determining an accumulated descending direction based on the descending direction using a predetermined accumulating rate; and
updating the plurality of precoded signals based on the accumulated descending direction and an update step size.

15. The method of claim 14, wherein the update step size is determined at least in part based on the plurality of intended signals and channel state information about a wireless channel between the transmitter and the plurality of receivers.

16. The method of claim 14, wherein updating the plurality of precoded signals based on the accumulated descending direction and the update step size comprises:
updating the plurality of precoded signals, based on the accumulated descending direction and the update step size, with a monotonically increasing, odd symmetric and saturating function for real and imaginary parts of the plurality of precoded signals, separately.

17. The method of claim 10, wherein the acts further comprise:
after the determination of the descending direction and the determination of the plurality of precoded signals are performed iteratively for a predetermined times, updating the normalized factor based on the plurality of precoded signals.

18. The method of claim 10, wherein the acts further comprise: regularizing the plurality of precoded signals.

19. An apparatus comprising:
circuitry configured for determining a normalized factor for precoding of a plurality of signals intended for a plurality of receivers;
circuitry configured for precoding the plurality of intended signals using the normalized factor with iteratively performing acts comprising:
determining, with using the normalized factor, a descending direction of a difference between the plurality of intended signals and corresponding signals received at the plurality of receivers, a descending rate of the difference being above a threshold rate in the descending direction, and
determining a plurality of precoded signals based on the descending direction; and
circuitry configured for quantizing the plurality of precoded signals for transmission with the transmitter to the plurality of receivers.

20. A non-transitory computer readable storage medium comprising program instructions stored thereon, the instructions, when executed with a processor of a device, causing the device to perform the method of claim 10.

* * * * *